United States Patent
Oishi et al.

(10) Patent No.: US 9,145,115 B2
(45) Date of Patent: Sep. 29, 2015

(54) VEHICLE CONTROL APPARATUS

(75) Inventors: Toshiya Oishi, Nagoya (JP); Masashi Takagi, Nagoya (JP); Michihito Shimada, Mishima (JP); Yuki Minase, Susono (JP); Kenichi Okaya, Susono (JP); Tsutomu Miyazaki, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/515,091

(22) PCT Filed: Dec. 17, 2009

(86) PCT No.: PCT/JP2009/006957
§ 371 (c)(1),
(2), (4) Date: Jun. 11, 2012

(87) PCT Pub. No.: WO2011/074037
PCT Pub. Date: Jun. 23, 2011

(65) Prior Publication Data
US 2012/0290179 A1  Nov. 15, 2012

(51) Int. Cl.
*B60W 30/00* (2006.01)
*B60T 7/12* (2006.01)
(Continued)

(52) U.S. Cl.
CPC . *B60T 7/12* (2013.01); *B60T 7/042* (2013.01); *B60W 10/06* (2013.01); *B60W 10/10* (2013.01); *B60W 10/119* (2013.01); *B60W 30/18054* (2013.01); *B60W 30/192* (2013.01); *B60W 50/10* (2013.01); *F02D 29/02* (2013.01); *F02N 11/0822* (2013.01); *B60T 2260/08* (2013.01);
(Continued)

(58) Field of Classification Search
USPC ............ 701/54, 70, 112; 123/350, 361; 180/65.21, 56.28
See application file for complete search history.

(56) References Cited

U.S. PATENT DOCUMENTS 4,791,900 A * 12/1988 Buck et al. .......... 123/359
6,170,864 B1    1/2001 Fujita et al.
(Continued)

FOREIGN PATENT DOCUMENTS

JP    62-51737 A       3/1987
JP    2003-175747 A    6/2003
(Continued)

OTHER PUBLICATIONS

International Search Report of PCT/JP2009/006957 mailed Jan. 19, 2010.
(Continued)

*Primary Examiner* — Redhwan k Mawari
*Assistant Examiner* — Edward Torchinsky
(74) *Attorney, Agent, or Firm* — Kenyon & Kenyon LLP

(57) ABSTRACT

Disclosed is a vehicle control apparatus which can prevent the deterioration of drivability. The ECU can set a control accelerator opening degree to be converted when a control permission condition is established. The control accelerator opening degree is equal to or larger than an accelerator lower limit which is larger than an idle determination value for determining an automatic stopping of an engine by an eco-run. The control accelerator opening degree thus set can prevent the drivability from being deteriorated without the automatic stopping of the engine being caused even if the accelerator opening degree is converted to reduce the torque of the engine with the establishment of the control permission condition.

14 Claims, 9 Drawing Sheets

(51) Int. Cl.

| | | |
|---|---|---|
| *B60T 7/04* | (2006.01) | |
| *B60W 10/06* | (2006.01) | |
| *B60W 10/10* | (2012.01) | |
| *B60W 30/18* | (2012.01) | |
| *B60W 30/192* | (2012.01) | |
| *B60W 50/10* | (2012.01) | |
| *F02D 29/02* | (2006.01) | |
| *F02N 11/08* | (2006.01) | |
| *B60W 10/119* | (2012.01) | |
| *F02D 45/00* | (2006.01) | |
| *F02D 41/08* | (2006.01) | |

(52) U.S. Cl.
CPC ............... *B60W 30/00* (2013.01); *F02D 41/08* (2013.01); *F02D 45/00* (2013.01); *F02N 2200/101* (2013.01); *F02N 2200/102* (2013.01); *Y02T 10/48* (2013.01)

(56) References Cited

U.S. PATENT DOCUMENTS

| | | | |
|---|---|---|---|
| 6,347,268 B1 | 2/2002 | Fujita et al. | |
| 6,353,784 B1 | 3/2002 | Miyaguchi et al. | |
| 6,892,128 B2 | 5/2005 | Asakawa et al. | |
| 6,915,782 B2 | 7/2005 | Hanada et al. | |
| 7,041,030 B2 | 5/2006 | Kuroda et al. | |
| 7,074,157 B2 | 7/2006 | Wakashiro et al. | |
| 7,099,757 B2 | 8/2006 | Niki et al. | |
| 8,224,544 B2 | 7/2012 | Sah et al. | |
| 8,428,845 B2 * | 4/2013 | Miyazaki et al. | 701/101 |
| 8,442,741 B2 | 5/2013 | Minase et al. | |
| 2004/0011580 A1 | 1/2004 | Miyata et al. | |
| 2005/0003928 A1 | 1/2005 | Niki et al. | |
| 2010/0036566 A1 | 2/2010 | Hayami | |
| 2010/0076661 A1 | 3/2010 | Ueoka et al. | |
| 2011/0112740 A1 * | 5/2011 | Hashimoto | 701/70 |
| 2012/0095634 A1 | 4/2012 | Miyamoto et al. | |
| 2012/0116650 A1 * | 5/2012 | Miyazaki et al. | 701/102 |
| 2012/0259524 A1 * | 10/2012 | Miyazaki et al. | 701/70 |
| 2012/0290179 A1 | 11/2012 | Oishi et al. | |
| 2012/0290188 A1 * | 11/2012 | Oishi et al. | 701/99 |
| 2013/0024090 A1 | 1/2013 | Minase et al. | |
| 2013/0030674 A1 | 1/2013 | Minase et al. | |
| 2013/0030675 A1 | 1/2013 | Minase et al. | |
| 2013/0325236 A1 | 12/2013 | Endo et al. | |

FOREIGN PATENT DOCUMENTS

| | | |
|---|---|---|
| JP | 2005-323481 A | 11/2005 |
| JP | 2008049775 A | 3/2008 |
| JP | 2008-174048 A | 7/2008 |
| JP | 2008168720 A | 7/2008 |
| JP | 2008-296806 A | 12/2008 |
| JP | 2009-166670 A | 7/2009 |

OTHER PUBLICATIONS

Office Action dated Oct. 8, 2014, issued to U.S. Appl. No. 13/984,658.
Final Office Action dated May 11, 2015 in U.S. Appl. No. 13/984,658.

* cited by examiner

FIG.4

|   |      | C1 | C2 | B1 | B2 | B3 | F |
|---|------|----|----|----|----|----|---|
|   | P    | ×  | ×  | ×  | ×  | ×  | × |
|   | R    | ×  | ×  | ×  | ○  | ○  | × |
|   | N    | ×  | ×  | ×  | ×  | ×  | × |
| D | 1st  | ○  | ×  | ×  | ◎  | ×  | △ |
|   | 2nd  | ○  | ×  | ○  | ×  | ×  | × |
|   | 3rd  | ○  | ×  | ×  | ×  | ○  | × |
|   | 4th  | ○  | ○  | ×  | ×  | ×  | × |
|   | 5th  | ×  | ○  | ×  | ×  | ○  | × |
|   | 6th  | ×  | ○  | ○  | ×  | ×  | × |

○ ENGAGED  × DISENGAGED
◎ ENGAGED ONLY WHEN ENGINE BRAKE IS APPLIED
△ ENGAGED ONLY WHEN DRIVING

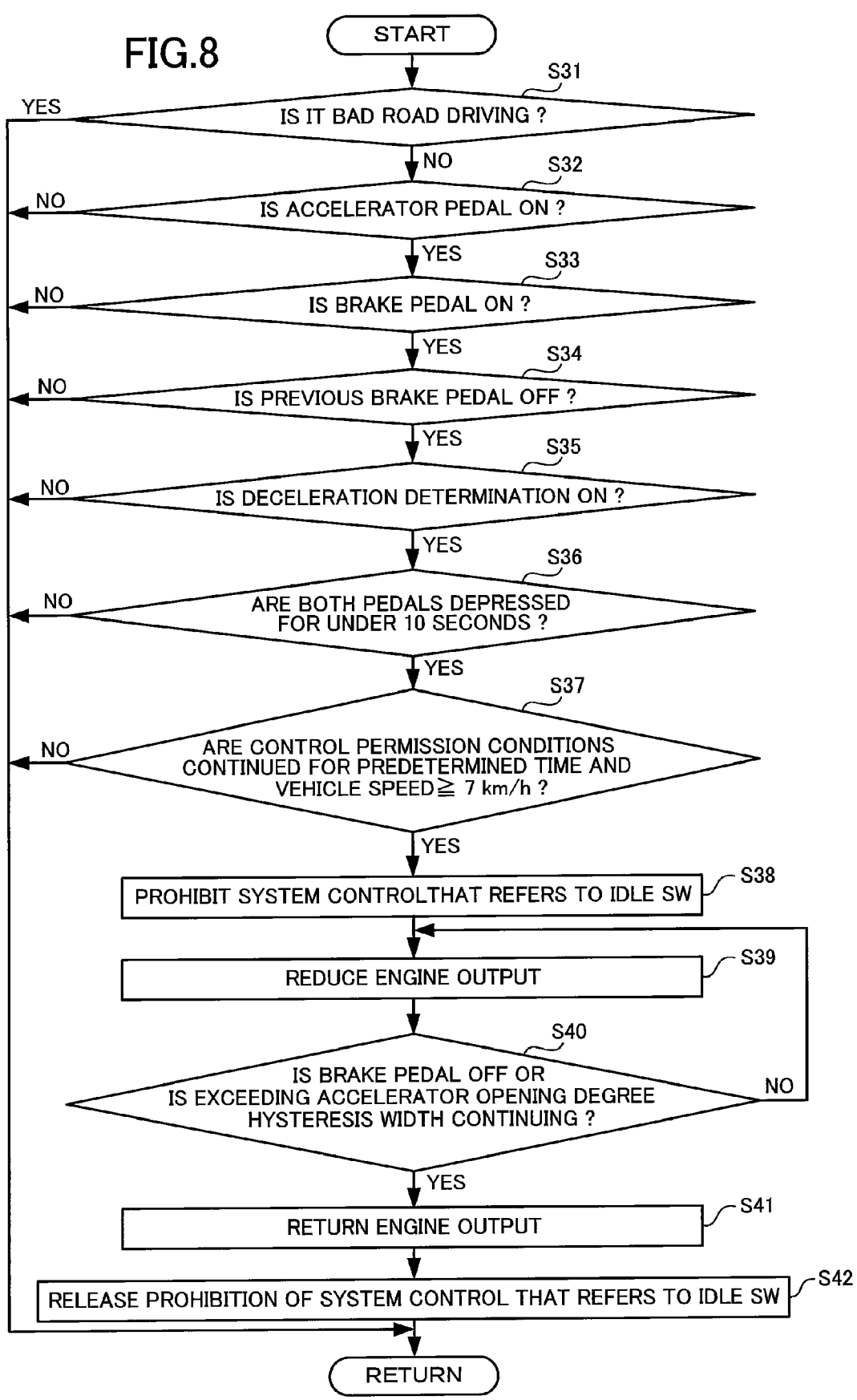

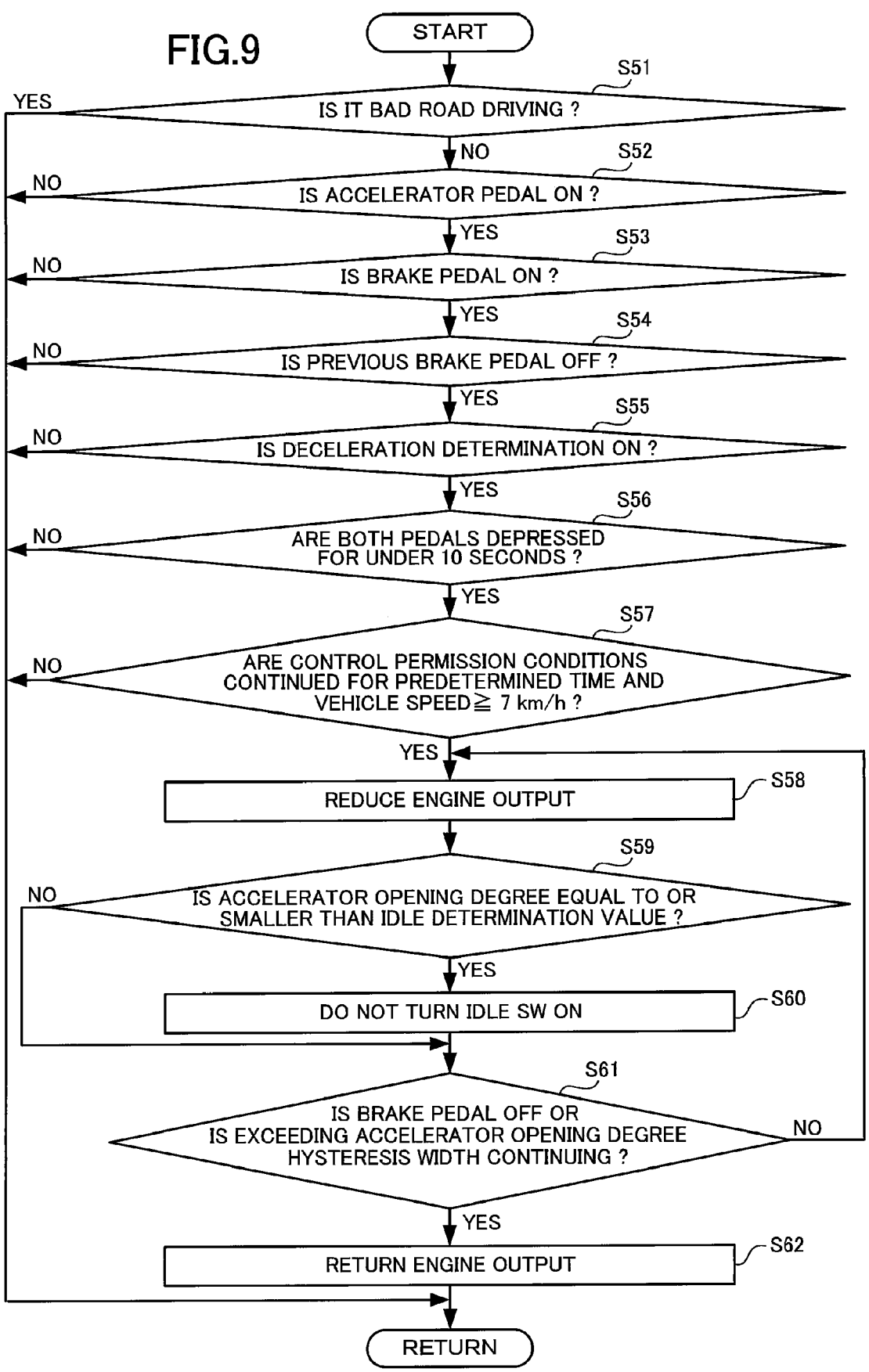

VEHICLE CONTROL APPARATUS

TECHNICAL FIELD

The present invention relates to a vehicle control apparatus, and more particularly to a vehicle control apparatus that controls the output of a power source.

BACKGROUND ART

In general, a vehicle has three fundamentally necessary abilities including a "driving force" as an ability of "advancing", a "steering force" as an ability of "turning", and a "braking force" as an ability of "stopping".

The "driving force" is a power, i.e., a torque generated by a power source of an internal combustion engine (hereinafter simply referred to as "engine") in response to such an amount of depression of an accelerator pedal and transmitted through a transmission to driving wheels to be obtained as a frictional reaction force of the driving wheels and a road surface allowing the driving wheels to travel thereon. The "steering force" is obtained by a steering device capable of changing the advancing direction of, for example, front wheels in response to the operation amount of a steering wheel. The "braking force" is generated in response to the amount of depression of a brake pedal by slowing down or stopping the rotation of the driving wheels to generate a frictional reaction force of the driving wheels and the road surface allowing the vehicle to be stopped.

In general, the accelerator pedal and the brake pedal are located adjacent to each other in the neighborhood of the location of the driver's feet. Many drivers depress selectively the accelerator pedal or the brake pedal only with his or her right foot to control the "driving force" and the "braking force", viz., to control a vehicle speed.

In that case, for example, a vehicle with an automatic transmission (hereinafter simply referred to as "AT car") is provided with no clutch pedal, thereby allowing some drivers to drive his or her car while depressing the brake pedal with his or her left foot and depressing the accelerator pedal with his or her right foot. In this way, there are some drivers who drive their cars separately using their left foot and right foot to depress the brake pedal and the accelerator pedal, respectively. For such drivers using both their feet separately for the brake pedal and the accelerator pedal, there is a possible case that the brake pedal is depressed while the accelerator pedal is not being released by the driver, or otherwise the accelerator pedal is depressed while the brake pedal is not being released by the driver.

Therefore, there are some cases in which the simultaneous depressions of the accelerator pedal and the brake pedal as previously mentioned are apt to lead to deterioration in drivability.

There has so far been known a vehicle control apparatus which can reduce an output of the engine in the event that the accelerator pedal and the brake pedal are depressed at the same time (see, for example, Patent Document 1).

The previously mentioned conventional vehicle is constructed to reduce the torque outputted by the engine with the fuel injection amount of the engine being temporarily reduced in the case that the accelerator pedal and the brake pedal are depressed at the same time.

In recent years, there have been developed a wide variety of vehicle control apparatuses each of which is provided with what is called an eco-run control function to have an engine automatically stopped and restarted under predetermined conditions that saves fuel consumption and reduces exhaust gas emissions.

The vehicle control apparatus provided with such an eco-run control function is constructed to have the engine automatically stopped under a predetermined stopping condition and restarted under a predetermined restarting condition. More specifically, the vehicle control apparatus is constructed to have the engine automatically stopped when the vehicle is stopped for a red signal at an intersection, and to have the engine automatically restarted when the accelerator pedal is then depressed to start the vehicle, thereby making it possible to halt the consumption of fuel and the emission of exhaust gas during the time period that the engine is stopped and then restarted.

Further provided is another vehicle control apparatus which is provided with a brake hold function to have its brakes remain held on at the time when the vehicle is stopped. The vehicle control apparatus provided with such a brake hold function is constructed to have the brakes held on even if the brake pedal is not depressed at all times, for example, after the vehicle is stopped in traffic jam or waiting for a traffic signal change at an intersection.

CITATION LIST

Patent Literature

{PTL1}
Patent Document 1: Japanese Patent Application Publication No. 62-051737

SUMMARY OF INVENTION

Technical Problems

However, the conventional vehicle control apparatus is constructed to uniformly reduce the fuel injection amount to the engine and thereby reduce the torque irrespective of the vehicle travelling state when the accelerator pedal and the brake pedal are depressed by the driver at the same time. This results in the fact that the conventional vehicle control apparatus is not designed in consideration of the effects of the eco-run control function, the brake hold function, and other functions, thereby causing a vehicle stoppage, a hesitation and other unfavorable phenomena on the vehicle irrespective of the driver's intention, thereby leading to problems such as deteriorated drivability.

The present invention has been made to solve such conventional problems as previously mentioned. It is therefore an object of the present invention to provide a vehicle control apparatus which can prevent the deterioration of the drivability.

Solution to Problem

In order to solve the above problems, a vehicle control apparatus according to the present invention, (1) a vehicle control apparatus for a vehicle provided with a power source, an accelerator pedal, and a brake pedal, the vehicle control apparatus comprising: an accelerator opening degree detection unit that detects a depression amount of the accelerator pedal as an actual accelerator opening degree; a brake detection unit that detects a depression of the brake pedal; a power shutoff unit that shuts off a power transmission to be transmitted from the power source to driving wheels; a permission condition determination unit that determines a control permission condition being established when the depression of the accelerator pedal is detected by the accelerator opening degree detection unit, and the depression of the brake pedal is detected by the brake detection unit; an output control unit that executes a reduction control to reduce a driving force to be outputted by the power source by converting the actual accelerator opening degree detected by the accelerator opening degree detection unit to a control accelerator opening degree when the control permission condition established is determined by the permission condition determination unit; and a power shutoff prohibition unit that prohibits shutting off the power transmission to be transmitted from the power source to the driving wheels by the power shutoff unit when the reduction control is executed by the output control unit.

By the construction of the vehicle control apparatus as set forth in the above definition (1), when the depressions of both the accelerator pedal and the brake pedal are detected at the same time, while the reduction control to reduce the driving force outputted from the power source is being executed, the vehicle provided with the function to shut off the power transmission transmitted from the power source to the driving wheels can prohibit the power transmission caused by the execution of the reduction control from being shut off. As a consequence, the vehicle can be prevented from being stopped unnecessarily even when the driving force is reduced, thereby making it possible to prevent the drivability from being deteriorated.

In the vehicle control apparatus as set forth in the above definition (1), a vehicle control apparatus according to the present invention comprising: (2) the power source has an engine, the power shutoff unit is operative to shut off the power transmission by having the engine automatically stopped with a predetermined stoppage condition established, and the power shutoff prohibition unit is operative to prohibit the power shutoff unit from having the engine automatically stopped when the reduction control is executed by the output control unit.

By the construction of the vehicle control apparatus as set forth in the above definition (2), the vehicle, provided with an eco-run control function to perform an automatic stopping of the engine when a predetermined stopping condition is established, can prohibit the automatic stopping of the engine caused by the execution of the reduction control when executing the reduction control to reduce the driving force outputted from the engine. Accordingly, the vehicle can prevent the unnecessary automatic stopping of the engine, thereby making it possible to prevent the drivability from being deteriorated.

In the vehicle control apparatus as set forth in the above definition (2), (3) the power shutoff unit is operative to have the engine automatically stopped when the control accelerator opening degree is not more than an idle determination value preliminarily set, and the power shutoff prohibition unit is operative to allow the control accelerator opening degree to be converted by the output control unit to have a value equal to or larger than accelerator lower limit value that is larger than the idle determination value.

By the construction of the vehicle control apparatus as set forth in the above definition (3), the control accelerator opening degree to be converted when the control permission condition is established becomes equal to or larger than the accelerator lower limit value that is larger than the idle determination value. As a consequence, the automatic stopping of the engine is by no means performed even when the accelerator opening value is converted with the control permission condition being established, thereby making it possible to prevent the drivability from being deteriorated.

In the vehicle control apparatus as set forth in the above definition (2), (4) the power shutoff unit is operative to have the engine automatically stopped when the control accelerator opening degree is not more than an idle determination value preliminarily set, and the power shutoff prohibition unit is operative to prohibit the power shutoff unit from having the engine automatically stopped when the control permission established is determined by the permission condition determination unit.

By the construction of the vehicle control apparatus as set forth in the above definition (4), the vehicle control apparatus thus constructed can prohibit the automatic stopping of the engine when the control permission condition is established. Therefore, even if the reduction control to reduce the driving force outputted from the engine is executed when the depressions of both the accelerator pedal and the brake pedal at the same time are detected, the automatic stopping of the engine is by no means performed, thereby making it possible to prevent the drivability from being deteriorated.

In the vehicle control apparatus as set forth in the above definition (2), a vehicle control apparatus according to the present invention comprising: (5) an idle determination unit that determines an idle state when the control accelerator opening degree is not more than an idle determination value preliminarily set, and in which the power shutoff unit is operative to have the engine automatically stopped when the idle state is determined by the idle determination unit, and the power shutoff prohibition unit is operative not to allow the idle determination unit to determine the idle state even if the control accelerator opening degree is not more than the idle determination value during the execution of the reduction control by the output control unit.

By the construction of the vehicle control apparatus as set forth in the above definition (5), the vehicle control apparatus thus constructed can determine an idle state when the control accelerator opening degree becomes equal to or smaller than the idle determination value, and can perform the automatic stopping of the engine when the idle state is determined. On the other hand, the vehicle control apparatus cannot determine the idle state while the reduction control is in execution. As a consequence, the automatic stopping of the engine by the execution of the reduction control is by no means performed, thereby making it possible to prevent the drivability from being deteriorated.

In the vehicle control apparatus as set forth in the above definition (1), a vehicle control apparatus according to the present invention comprising: (6) a braking unit that brakes the driving wheels, and in which the power shutoff unit is operative to shut off the power transmission by executing a retaining control that retains the braking of the driving wheels by the braking unit when a predetermined braking retaining condition is established, and the power shutoff prohibition unit is operative not to allow the power shutoff unit to execute the retaining control when the reduction control is executed by the output control unit.

By the construction of the vehicle control apparatus as set forth in the above definition (6), the vehicle control apparatus, provided with a brake hold function to hold the braking for the driving wheels when the braking hold condition is established, can prohibit the holding control of the driving wheels caused by the execution of the reduction control when the reduction control to reduce the driving force outputted from the engine is executed. As a consequence, the unnecessary hold of braking can be prevented, thereby making it possible to prevent the drivability from being deteriorated.

In the vehicle control apparatus as set forth in the above definition (6), (7) the power shutoff unit is operative to execute the retaining control when the control accelerator opening degree is not more than an idle determination value preliminarily set, and the power shutoff prohibition unit is operative to allow the control accelerator opening degree to be converted by the output control unit to have a value no less than accelerator lower limit that is larger than the idle determination value.

By the construction of the vehicle control apparatus as set forth in the above definition (7), the control accelerator opening degree to be converted when the control permission condition is established becomes equal to or larger than the accelerator lower limit value that is larger than the idle determination value at which the holding control of the driving wheels is performed. Therefore, the holding control of the driving wheels is by no means performed even when the accelerator opening degree is converted with the control permission condition being established, thereby making it possible to prevent the drivability from being deteriorated.

In the vehicle control apparatus as set forth in the above definition (6), (8) the power shutoff unit is operative to execute the retaining control when the control accelerator opening degree is not more than an idle determination value preliminarily set, and the power shutoff prohibition unit is operative not to allow the power shutoff unit to execute the retaining control when the control permission established is determined by the permission condition determination unit.

By the construction of the vehicle control apparatus as set forth in the above definition (8), the vehicle control apparatus thus constructed can prohibit the holding control of the driving wheels when the control permission condition is established. Accordingly, the holding control of the driving wheels is by no means performed even if the reduction control to reduce the driving force outputted from the engine is executed when the depressions of both the accelerator pedal and the brake pedal at the same time are detected, thereby making it possible to prevent the drivability from being deteriorated.

In the vehicle control apparatus as set forth in the above definition (6), a vehicle control apparatus according to the present invention comprising: (9) an idle determination unit that determines an idle state when the control accelerator opening degree is not more than an idle determination value preliminarily set, and in which the power shutoff unit is operative to execute the retaining control when the idle state is determined by the idle determination unit, and the power shutoff prohibition unit is operative not to allow the idle determination unit to determine the idle state even if the control accelerator opening degree is not more than the idle determination value during the execution of the reduction control by the output control unit.

By the construction of the vehicle control apparatus as set forth in the above definition (9), the vehicle control apparatus thus constructed can determine an idle state when the control accelerator opening degree becomes equal to or smaller than the idle determination value, and can perform the holding control of the driving wheels when the idle state is determined. On the other hand, the vehicle control apparatus cannot determine the idle state while the reduction control is in execution. As a consequence, the holding control of the driving wheels by the execution of the reduction control is by no means performed, thereby making it possible to prevent the drivability from being deteriorated.

In the vehicle control apparatus as set forth in any one of the above definition (1) to (9), (10) the permission condition determination unit is operative to determine that the control permission condition is established when the depression of the brake pedal is detected by the brake detection unit in the state that the depression of the accelerator pedal is detected by the accelerator detection unit.

By the construction of the vehicle control apparatus as set forth in the above definition (10), the vehicle control apparatus thus constructed can reduce the driving force outputted from the power source when the brake pedal depressed with the accelerator pedal being depressed is detected, resulting from the driving condition under which driver generally requests for braking of the vehicle in the event that the brake pedal is depressed with the accelerator pedal being depressed.

In the vehicle control apparatus as set forth in any one of the above definition (1) to (10), a vehicle control apparatus according to the present invention comprising: (11) a speed reduction determination unit that detects the state of the vehicle to determine a speed reduction of the vehicle, and in which the permission condition determination unit is operative to determine that the control permission condition is established when the speed reduction of the vehicle is determined by the speed reduction determination unit.

By the construction of the vehicle control apparatus as set forth in the above definition (11), the vehicle control apparatus thus constructed can reduce the driving force outputted from the power source when determining the deceleration of vehicle under the condition of both the accelerator pedal and the brake pedal being depressed, resulting from the fact that the vehicle is under the state that the driver requests to brake when the vehicle is being decelerated.

In the vehicle control apparatus as set forth in the above definition (11), a vehicle control apparatus according to the present invention comprising: (12) a brake depression force detection unit that detects a depression amount of the brake pedal, and in which the speed reduction determination unit is operative to determine the speed reduction in accordance with the depression amount of the brake pedal detected by the brake depression force detection unit.

By the construction of the vehicle control apparatus as set forth in the above definition (12), the vehicle control apparatus thus constructed can determine that the driver is requesting for braking of the vehicle in accordance with the depression amount of the brake pedal, resulting from the fact the depression amount of the brake pedal is increased as compared with the depression amount of the brake pedal depressed together with the accelerator pedal when the driver is requesting for braking the vehicle. As a consequence, the driving force outputted from the power source can be reduced when the deceleration of vehicle is determined in accordance with the depression amount of the brake pedal.

In the vehicle control apparatus as set forth in the above definition (11), a vehicle control apparatus according to the present invention comprising: (13) a vehicle body speed detection unit that detects a travel speed of the vehicle from the rotation number of driven wheels, and in which the speed reduction determination unit is operative to determine the speed reduction in accordance with the varied rotation number of the driven wheels detected by the vehicle body speed detection unit.

By the construction of the vehicle control apparatus as set forth in the above definition (13), the vehicle control apparatus thus constructed can determine whether or not the vehicle is decelerated in accordance with the rotation speed of the rolling wheels, resulting from the fact that the rotation speed of the rolling wheels is decreased when the vehicle is being decelerated. The driving force outputted from the power source can be reduced when the reduction in the rotation speed of the rolling wheels is detected.

In the vehicle control apparatus as set forth in any one of the above definition (1) to (13), a vehicle control apparatus according to the present invention comprising: (14) a vehicle speed detection unit that detects a vehicle speed, and in which the output control unit is operative to execute the reduction control when the vehicle speed detected by the vehicle speed detection unit is not less than a predetermined vehicle speed.

By the construction of the vehicle control apparatus as set forth in the above definition (14), the vehicle control apparatus thus constructed can execute the reduction control of driving force if the vehicle speed is at the predetermined vehicle speed or faster, and can allow the reduction control of driving force not to be executed so as to respond for a hill start and the like if the vehicle speed is below the predetermined vehicle speed. This makes it possible to prevent the deterioration of drivability while the necessary transmission of torque is performed.

In the vehicle control apparatus as set forth in any one of the above definition (1) to (14), (15) the output control unit is operative to execute the reduction control when the control permission condition established for no less than a predetermined time is determined by the permission condition determination unit.

By the construction of the vehicle control apparatus as set forth in the above definition (15), the vehicle control apparatus thus constructed not only can prevent the reduction control from being excessively executed but can prevent the driving force from being unnecessarily decreased. As a result, the deterioration of drivability can be prevented.

In the vehicle control apparatus as set forth in any one of the above definition (1) to (15), (16) the accelerator opening degree detection unit detects the depression amount of the accelerator pedal, and the output control unit is operative to finish the reduction control when the amount of depression of the accelerator pedal detected by the accelerator opening degree detection unit is varied larger than a predetermined depression amount.

By the construction of the vehicle control apparatus as set forth in the above definition (16), the vehicle control apparatus thus constructed can determine that there is a request to accelerate for the vehicle when the depression amount of the accelerator pedal is drastically changed. As consequence, the vehicle control apparatus can finish the reduction control, and can prevent the deterioration of drivability.

In the vehicle control apparatus as set forth in any one of the above definition (1) to (16), (17) the output control unit is operative to finish the reduction control of the driving force outputted from the power source when the brake pedal not depressed is detected by the brake detection unit.

By the construction of the vehicle control apparatus as set forth in the above definition (17), the vehicle control apparatus thus constructed can prevent the reduction of the driving force from unnecessarily continuing, thereby making it possible to prevent the drivability from being deteriorated.

Advantageous Effects of Invention

The vehicle control apparatus according to the present invention can prohibit the shutoff of the power transmission caused by the execution of reduction control performed to lower the driving force outputted from the power source, thereby preventing the vehicle from being stopped unnecessarily even when the driving force is lowered, thereby making it possible to prevent the drivability from being deteriorated.

BRIEF DESCRIPTION OF DRAWINGS

FIG. 4 is a table showing the engagement state of frictional engagement elements to realize each shift stage in the first embodiment of the present invention.

FIG. 8 is a flowchart showing a vehicle control process in a second embodiment of the present invention.

FIG. 9 is a flowchart showing a vehicle control process in a third embodiment of the present invention.

DESCRIPTION OF EMBODIMENTS

The embodiments of the invention will be described hereinafter with reference to the drawings.

First Embodiment

First, the construction of a vehicle having a control apparatus according to the first embodiment of the present invention will be described with reference to the schematic block diagram of the vehicle shown in FIG. 1 and the schematic block diagram of the vehicle control shown in FIG. 2.

Figure 1:
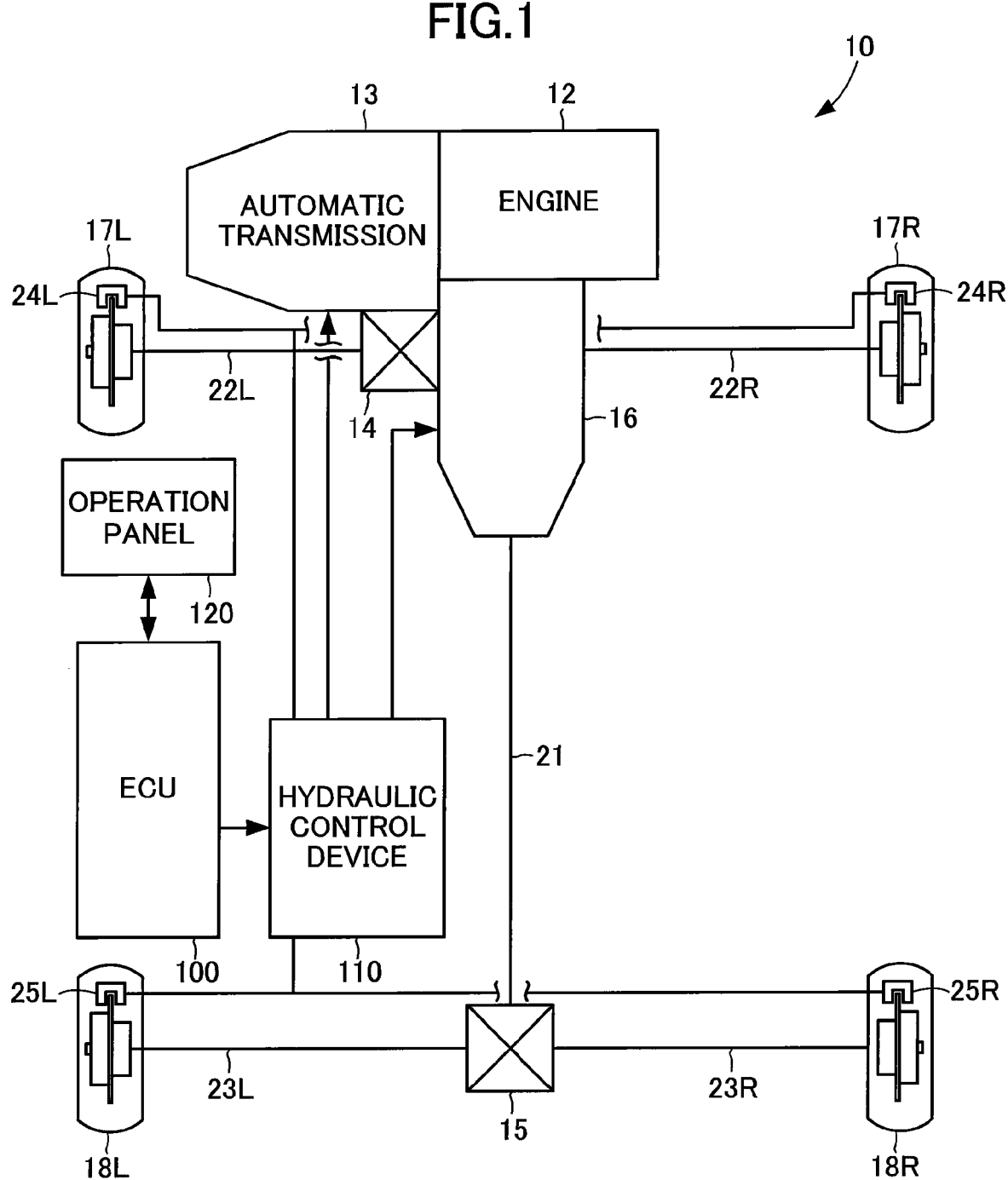
FIG. 1 is a schematic block diagram of a vehicle equipped with a control apparatus according to a first embodiment of the present invention.
Figure 2:
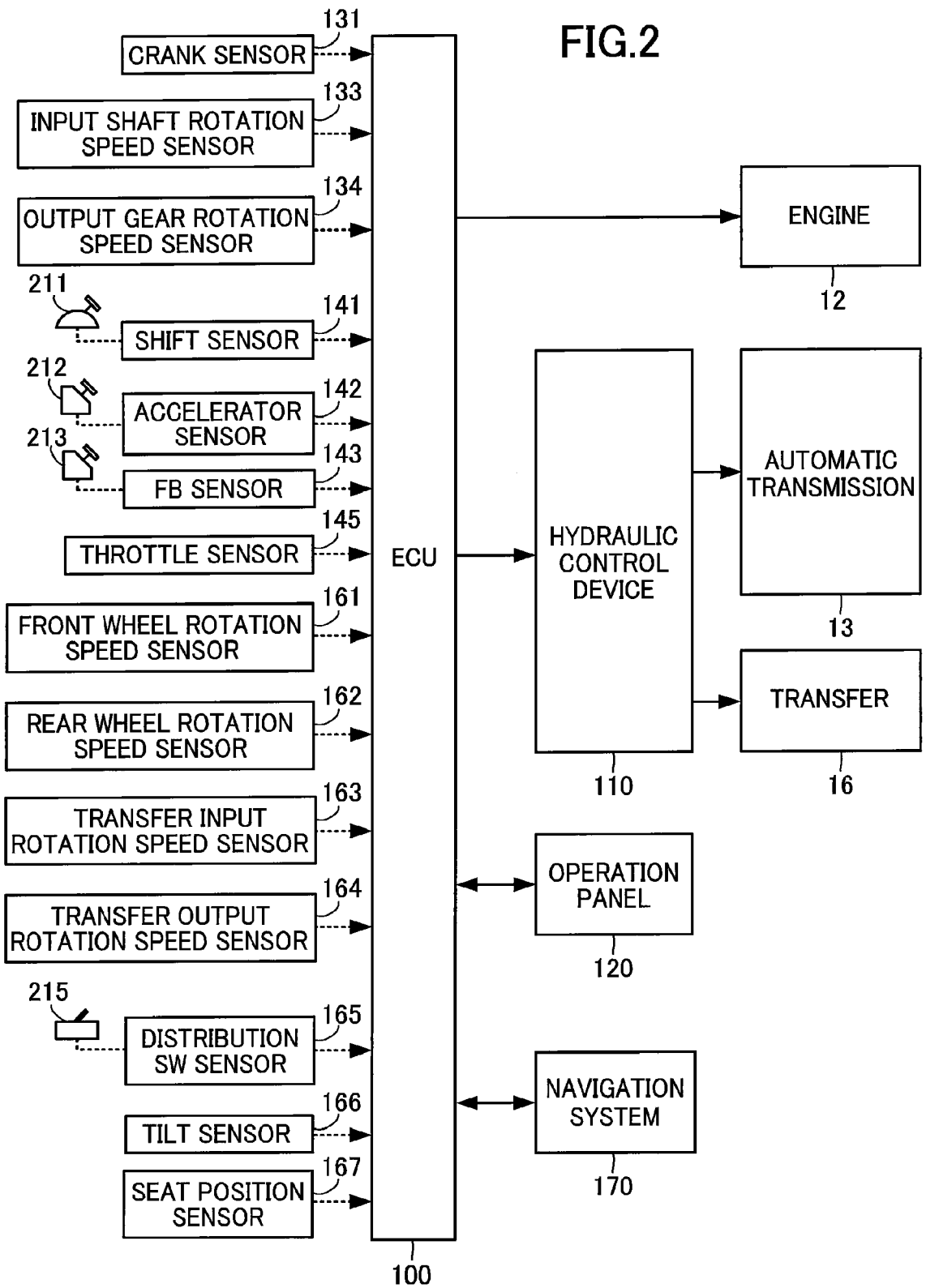
FIG. 2 is a schematic block diagram of the vehicle control according to the first embodiment of the present invention.

As shown in FIG. 1, a vehicle 10 according to the present embodiment comprises an engine 12 serving as a power source, an automatic transmission 13 that transmits a torque generated by the engine 12 and forms transmission stages corresponding to the travel conditions of the vehicle 10, a front differential mechanism 14 that distributes the torque transmitted from the automatic transmission 13 to left and right front drive shafts 22L, 22R, a rear differential mechanism 15 that distributes the torque transmitted by a propeller shaft 21 to left and right rear drive shafts 23L, 23R, a transfer 16 that distributes the torque transmitted by the automatic transmission 13 to front wheels 17L, 17R and rear wheels 18L, 18R, brake devices 24L, 24R that brakes the front wheels 17L, 17R, respectively, and brake devices 25L, 25R that brakes the rear wheels 18L, 18R, respectively.

Further, the vehicle 10 comprises an ECU (Electronic Control Unit) 100 serving as a vehicle electronic control unit that controls the entire vehicle 10, a hydraulic pressure control device 110 that hydraulically controls the automatic transmission 13 and the transfer 16, an operation panel 120 serving as an input/output interface with the driver, and a navigation system 170.

Further, the vehicle 10 is provided with a crank sensor 131, an input shaft rotation speed sensor 133, an output gear rotation speed sensor 134, a shift sensor 141, an accelerator sensor 142, a foot brake sensor 143 (hereinafter simply referred to as "FB sensor"), a throttle sensor 145, a front wheel rotation speed sensor 161, a rear wheel rotation speed sensor 162, a transfer input rotation speed sensor 163, a transfer output rotation speed sensor 164, a distribution SW sensor 165, a tilt sensor 166, a seat position sensor 167, and the various kinds of other sensors not shown in the drawings. The previously mentioned sensors are adapted to output their detection signals to the ECU 100.

The engine 12 is constituted by a known power device which can output torque by combusting in a combustion chamber of a cylinder not shown a mixture of hydrocarbon fuel such as gasoline or diesel and air. The engine 12 is operated to intermittently repeat the actions of taking in the air mixture into the combustion chamber of the cylinder, combusting the mixture in the cylinder, and discharging exhaust gas to the outside of the cylinder to reciprocate a piston in the cylinder to enable a crank shaft drivably coupled to the piston to be rotated, thereby transmitting the torque to the automatic transmission 13. The fuel to be used for the engine 12 may be an alcohol fuel including an alcohol such as ethanol.

The automatic transmission 13 includes a plurality of planetary gear devices each provided with a plurality of friction engagement elements constituted by clutches and brakes and operative to be selectively engaged or disengaged, thereby forming a plurality of transmission stages in response to the combination of the engagement and disengagement of the clutches and the brakes. The clutches and the brakes are constructed to be switched selectively into their engaged states or their disengaged states by the hydraulic pressure control device 110.

By this construction, the automatic transmission 13 functions as a staged transmission to reduce or increase the torque or rotation of the crank shaft of the engine 12 inputted as a driving force at a predetermined speed change ratio $\gamma$ to be outputted to the front differential mechanism 14 and the transfer 16. This means that the automatic transmission 13 constitutes a plurality of speed change stages operable in response to the vehicle travel states and thus can carry out a speed conversion in response to the speed change stages. The detailed explanation about the automatic transmission 13 will be described later. The automatic transmission 13 may be composed of a continuously variable transmission by continuously changing the transmission speed change ratio.

The front differential mechanism 14 is operative to allow the rotation speed to be different between the front wheels 17R and 17L when the vehicle is travelling through a curved road. The front differential mechanism 14 comprises a plurality of gears to distribute and output the torque inputted by the automatic transmission 13 to the front drive shafts 22L, 22R. The front differential mechanism 14 may be constructed to have the front drive shafts 22L, 22R rotated at the same rotation speed, and thus may be operated under a diff-locked state having no difference in rotation speed between the front wheels 17L, 17R. The detailed explanation about the front differential mechanism 14 will be described hereinafter.

The rear differential mechanism 15 is substantially the same in construction as the front differential mechanism 14, so that the explanation about the rear differential mechanism 15 will be omitted hereinafter.

The transfer 16, also known as an auxiliary transmission, serves to distribute and transmit to the front differential mechanism 14 and the rear differential mechanism 15 the torque transmitted by the automatic transmission 13. This means that the torque transmitted by the automatic transmission 13 can be distributed and transmitted by the transfer 16 to the front wheels 17L, 17R and the rear wheels 18L, 18R.

The vehicle 10 in the present embodiment is exemplified as a front-wheel driving vehicle at the time of a usual drive state in which the front wheels 17L, 17R serve as driving wheels, respectively, when a four-wheel drive state is not selected. The transfer 16 is operative in the usual drive state and the four-wheel drive state as described hereinafter. This means that the transfer 16 can be operated at the usual drive state to transmit the torque transmitted by the automatic transmission 13 only to the front differential mechanism 14 but not to the rear differential mechanism 15. Further, the transfer 16 can be operated at the four-wheel drive state to distribute and transmit the torque transmitted by the automatic transmission 13 to the front differential mechanism 14 and the rear differential mechanism 15. The detailed description about the transfer 16 will become apparent as the description proceeds.

The brake devices 24L, 24R and the brake devices 25L, 25R are adapted to be operated by a brake master cylinder hydraulically connected with brake actuators, and brake units not shown in the drawings. The brake master cylinder is constructed to generate a hydraulic pressure differentiated in response to the depression amount of a foot brake pedal 213. The hydraulic pressure generated by the brake master cylinder is transmitted to the respective brake units through the respective brake actuators. The brake units are adapted to convert the transmitted hydraulic pressure to a mechanical force and to brake the front wheels 17L, 17R and the rear wheels 18L, 18R.

The brake devices 24L, 24R and the brake devices 25L, 25R are adapted to be controlled by an ECU 100 and a hydraulic pressure control device 110 to brake the front wheels 17L, 17R and the rear wheels 18L, 18R irrespective of the depression amount of the foot brake pedal 213. The brake device 24L is constructed to apply the brake to the front wheel 17L, while the brake device 24R is constructed to apply the brake to the front wheel 17R. Similarly, the brake device 25L and the brake device 25R are constructed to apply the brake to the rear wheel 18L, and the rear wheel 18R, respectively.

The ECU 100 comprises a CPU (Central Processing Unit) as a central processing unit, a ROM (Read Only Memory) for storing therein fixed data, a RAM (Random Access Memory) for storing data therein temporarily, an EEPROM (Electrically Erasable and Programmable Read Only Memory) made of a rewritable non-volatile memory, and an I/O interface circuit, and is designed to carry out the overall control of the vehicle 10.

As will be stated below, the ECU 100 is connected to the crank sensor 131, the accelerator sensor 142, and the other sensors. The ECU 100 is adapted to receive detection signals outputted from these sensors to detect an engine speed Ne, an accelerator opening degree Acc, and others.

The ECU 100 has an internal clock capable of measuring time. Further, the ECU 100 is adapted to control the hydraulic pressure control device 110 which can control the hydraulic pressure for the parts of the automatic transmission 13 and the transfer 16. However, the characteristic functions of the ECU 100 will be described hereinafter.

In addition, the ROM of the ECU 100 is adapted to store therein an operating table to be used for realizing the transmission stages, and a program for performing the vehicle control as described hereinafter. Further, the ROM of the ECU 100 is adapted to store therein a throttle opening degree control map, a gear shifting diagram, a lock-up control map, and various other values of the vehicle 10 which will not be described in detail hereafter.

Furthermore, the ROM of the ECU 100 is adapted to store therein an accelerator pedal depression determination value Acc_tv, a brake pedal depression determination value Bf_tv, and a speed reduction brake determination value BfDc_tv.

The accelerator pedal depression determination value Acc_tv is indicative of a determination value that determines whether or not the vehicle 10 is under an accelerator-on state or an accelerator-off state in response to the depression amount of an accelerator pedal 212. The foot brake pedal depression determination value Bf_tv is indicative of a determination value that determines whether the vehicle 10 is under a brake-on state or a brake-off state in response to the depression amount of the foot brake pedal 213.

The speed reduction brake determination value BfDc_tv is indicative of a determination value that determines whether or not the vehicle 10 is under the speed reduction state in response to the depression amount of the foot brake pedal 213. The speed reduction brake determination value BfDc_tv may be calculated in response to the travelling state of the vehicle 10.

The ROM of the ECU 100 is adapted to store therein an idle determination value and an accelerator lower limit value.

The idle determination value is indicative of a determination value that determines whether or not the vehicle 10 is under the idle state in accordance with the accelerator opening degree. Here, the accelerator opening degree which the ECU 100 uses for determination is indicative of an actual accelerator opening degree Acc or a control accelerator degree. The control accelerator opening degree is indicative of an accelerator opening degree converted from the actual opening degree Acc at the time of the establishment of a control permission condition which will become apparent as the description proceeds. The ECU 100 is operative to determine that the vehicle 10 is under the idle state and to turn an idle switch SW on when the accelerator opening degree is smaller than the idle determination value, while being operative to determine that the vehicle 10 is not under the idle state and to turn an idle switch SW off when the accelerator opening degree is larger than the idle determination value.

The accelerator lower limit value is indicative of a lower limit value of an output reducing accelerator opening degree Acn converted from the opening degree Acc at the time of the establishment of the control permission condition. Here, the accelerator lower limit value is larger than the above idle determination value. The ECU 100 in the present embodiment is therefore operative to have the accelerator opening degree not smaller than the accelerator lower limit value even if the control permission condition is established, so that the accelerator opening degree is by no means equal to or less than the idle determination value. The vehicle 10 is by no means under the idle state, resulting from the execution of the reduction control to reduce the torque of the engine 12 which will be described hereinafter. The previously mentioned output reducing accelerator opening degree Acn may be a preliminarily set value, however, is preferably calculated in response to the travelling state of the vehicle 10.

The hydraulic pressure control device 110 comprises linear solenoid valves SLT, SLU, an on-off solenoid valve SL, and linear solenoid valves SL1 to SL5, each of which is constituted by an electromagnetic valve to be controlled by the ECU 100. The hydraulic pressure control device 110 is adapted to be controlled by the ECU 100 to operate the above solenoid valves, so that the hydraulic circuit is switched and hydraulically controlled to operate the whole parts of the automatic transmission 13. Therefore, the hydraulic pressure control device 110 is adapted to control the solenoid valves so that the solenoid valves can be switched to establish a desired speed change stage in the automatic transmission.

The operation panel 120 is operably connected with the ECU 100 to receive operational requests inputted by the driver, to perform operational assistances to the driver, and to display vehicle travel states and others. For example, when the driver inputs one of the travel modes using switches provided on the operation panel 120, the I/O interface of the ECU 100 is inputted with the signal indicative of the travel mode inputted by the driver.

The navigation system 170 comprises a map information storage unit for storing information including topographic maps, a current position acquisition section using GPS (Global Positioning System) to acquire the current position of the vehicle 10, and a display section to display information to the driver, thereby acquiring the topographical information of the current position of the vehicle 10. The navigation system 170 is adapted to guide the driver from the current position to the destination in a similar manner to the car navigation systems known in the art.

The crank sensor 131 is adapted to detect the rotation speed of a crank shaft 24 under the control of the ECU 100 and to output a detection signal indicative of the detected rotation speed to the ECU 100. The ECU 100 is adapted to acquire as an engine speed Ne the rotation speed of the crank shaft 24 indicated by the detection signal outputted by the crank sensor 131.

The input shaft rotation speed sensor 133 is adapted to detect the rotation speed of an input shaft 71 described below under the control of the ECU 100 and to output a detection signal indicative of the detected rotation speed to the ECU 100. The input shaft 71 is directly connected with a turbine shaft 62 of a torque converter 60 described later. The input shaft 71 has a rotation speed the same as the rotation speed of the turbine shaft 62, so that an input shaft rotation speed Nm detected by the input shaft rotation speed sensor 133 is represented as a turbine rotation speed Nt.

The output gear rotation speed sensor 134 is adapted to detect the rotation speed of an output gear 72 described later under the control of the ECU 100 and to output a detection signal indicative of the detected rotation speed to the ECU 100.

In addition, the ECU 100 is adapted to be capable of calculating a speed change ratio $\gamma$ in accordance with a transmission mechanism input shaft rotation speed Nm detected by the input shaft rotation speed sensor 133 and a transmission mechanism output rotation speed Nc detected by the output gear rotation speed sensor 134. Here, the "speed change ratio $\gamma$" is acquired by dividing the actual rotation speed Nm of the input shaft 71 by the actual rotation speed Nc of the output gear 72.

The shift sensor 141 is adapted to detect any one of switched positions taken by the shift lever 211 among the switched positions taken by the shift lever 211 under the control of the ECU 100 and to output a detection signal indicative of the switched position taken by the shift lever 211 to the ECU 100.

Here, the shift lever 211 is constructed to take, from the rear side to the forward side of the vehicle 10, a D position indicative of a driving range (hereinafter simply referred to as "D range"), an N position indicative of a neutral range, an R position indicative of a reverse range, and a P position indicative of a parking range.

If the shift lever 211 is located in the D range, a transmission mechanism 70 can establish any one of the speed stages from among the first to sixth speed stages as described below. In this way, the ECU 100 can select any one of the speed stages from among the first to sixth speed stages in accordance with the vehicle speed V and a throttle opening degree $\theta$ th.

The accelerator sensor 142 is under the control of the ECU 100, and adapted to detect the accelerator pedal depression amount (hereinafter simply referred to as a "stroke") and to output a detection signal indicative of the detected stroke to the ECU 100 when the accelerator pedal 212 is depressed. In addition, the ECU 100 is adapted to calculate the accelerator opening degree Acc from the stroke of the accelerator pedal 212 indicated by the detection signal outputted from the accelerator sensor 142.

Therefore, the accelerator sensor 142 is adapted to detect the depression of the accelerator pedal 212, and the depression amount of accelerator pedal 212. This means that the accelerator sensor 142 constitutes an accelerator opening degree detection unit as defined in the present invention.

The FB sensor 143 is under the control of the ECU 100, and adapted to detect the foot brake pedal depression amount (hereinafter simply referred to as a "stroke") and to output the detection signal indicative of the detected stroke to the ECU 100 when the foot brake pedal 213 is depressed. In addition, the ECU 100 is adapted to calculate the foot brake pedal depression force Bf from the stroke of the foot brake pedal 213 indicated by the detection signal outputted from the FB sensor 143.

This means that the FB sensor 143 is adapted to detect the depression of the foot brake pedal 213. In other words, the FB sensor 143 constitutes a brake detection unit as defined in the present invention. In addition, the FB sensor 143 is adapted to detect the depression amount of the foot brake pedal 213. In other words, the FB sensor 143 constitutes a foot brake pedal depression force detection unit as defined in the present invention.

In addition, the foot brake pedal depression force Bf indicative of the stroke of the foot brake pedal 213 detected by the FB sensor 143 may be replaced by a predetermined threshold value, i.e., the foot brake pedal depression determination value Bf_tv for the stroke of the foot brake pedal 213. In this case, the FB sensor 143 may output a foot brake pedal on-off signal based on whether or not the stroke of the foot brake pedal 213 is exceeding the previous predetermined threshold value.

In addition, the FB sensor 143 may be adapted to detect the hydraulic pressure fed to the brake units provided on the front wheels 17L, 17R, and to output to the ECU 100 a detection signal indicative of the detected hydraulic pressure fed to the hydraulic brake units. In this case, a predetermined threshold value is set for the hydraulic pressure of a brake cylinder, and the FB sensor 143 may output a foot brake pedal on-off signal based on whether or not the hydraulic pressure of the brake cylinder is exceeding the previous predetermined threshold value.

The throttle sensor 145 is under the control of the ECU 100, and adapted to detect the opening degree of a throttle valve of the engine 12 driven by a throttle actuator not shown, and to output a detection signal indicative of the detected opening degree to the ECU 100. The ECU 100 is adapted to acquire as a throttle opening degree θ th the throttle valve opening degree indicated by the detection signal outputted from the throttle sensor 145.

The ECU 100 is adapted to acquire the throttle opening degree θ th from the accelerator opening degree Acc based on the throttle opening degree control map so that, without using the detection signal outputted from the throttle sensor 145, the throttle opening degree θ th obtained from the above throttle opening degree control map can be substituted as a detected value. Here, in the case that the torque reduction control of the engine 12 causes the accelerator opening degree to be changed, the ECU 100 can acquire the throttle opening degree θ th from the changed output reducing accelerator opening degree Acn.

The front wheel rotation speed sensor 161 is under the control of the ECU 100, and adapted to detect the rotation speed of the front drive shaft 22R or 22L, and to output the detection signal indicative of the detected rotation speed to the ECU 100. Further, the ECU 100 is adapted to acquire as a drive shaft rotation speed Nd the rotation speed of the front drive shaft 22R or 22L indicated by the detection signal outputted by the front wheel rotation speed sensor 161.

The ECU 100 is adapted to calculate a vehicle speed V based on a drive shaft rotation speed Nd acquired from the front wheel rotation speed sensor 161. Here, the above vehicle speed V is indicative of a vehicle speed of a vehicle travelling on a usual road. The vehicle speed can be replaced by a vehicle speed Vr used for a vehicle travelling on roads possibly causing the front wheel 17L or 17R to slip, viz., for example travelling on a bad road and other abnormal situations. The vehicle speed Vr will become apparent as the description proceeds. The front wheel rotation speed sensor 161 is therefore adapted to detect the vehicle speed of the vehicle 10. This means that the front wheel rotation speed sensor 161 constitutes a vehicle speed detection unit as defined in the present invention.

The rear wheel rotation speed sensor 162 is under the control of the ECU 100, and adapted to detect the rotation speed of the rear drive shaft 23L or 23R, and to output the detection signal indicative of the detected rotation speed to the ECU 100. Further, the ECU 100 is adapted to acquire as a rear wheel rotation speed Nr the rotation speed of the rear drive shaft 23L or 23R indicated by the detection signal outputted by the rear wheel rotation speed sensor 162.

The ECU 100 is adapted to calculate the vehicle body speed Vr based on the rear wheel rotation speed Nr obtained from the rear wheel rotation speed sensor 162 in the case that only the front wheels 17L, 17R are driven, viz., the front wheel drive mode is selected. Here, the rear wheels 18L, 18R are each constituted by a rolling wheel not driven by the engine 12, so that the detection of the rotation speeds of the rear wheels 18L, 18R render it possible to obtain the vehicle body speed Vr, i.e., an actual vehicle speed of the vehicle 10.

As has been described in the above, the rear wheel rotation speed sensor 162 is adapted to detect the rotation speeds of the rear wheels 18L, 18R, viz., the vehicle speed of the vehicle 10 from the rotation speeds of the rolling wheels in the two-wheel drive mode. This means that the rear wheel rotation speed sensor 162 constitutes a vehicle body speed detection unit as defined in the present invention.

The transfer input rotation speed sensor 163 is under the control of the ECU 100, and adapted to detect a rotation speed TRin of the input shaft of the transfer 16 and to output a detection signal indicative of the detected rotation speed to the ECU 100. More specifically, the ECU 100 is adapted to detect the rotation speed of an input shaft 54 of a transfer clutch 53 as will become more apparent hereinafter.

The transfer output rotation speed sensor 164 is under the control of the ECU 100, and adapted to detect a rotation speed TRout of an output shaft of the transfer 16, and to output a detection signal indicative of the detected rotation speed to the ECU 100. More specifically, the ECU 100 is adapted to detect the rotation speed of the propeller shaft 21.

The distribution SW sensor 165 is under the control of the ECU 100, and adapted to detect whether a power changing switch 215 assumes a two-wheel drive selection position or a four-wheel drive selection position, and to output a detection signal indicative of the changed position of the power changing switch 215 to the ECU 100. The power changing switch 215 may be constructed to be able to select a distribution ratio of the driving forces of the front wheels 17L, 17R and the rear wheels 18L, 18R in lieu of the alternative selection of the two-wheel drive selection position or the four-wheel drive selection position according to the present invention.

The tilt sensor 166 is under the control of the ECU 100, and adapted to detect the tilt angle of the vehicle 10 and to output the detection signal indicative of the detected tilt angle to the ECU 100. More specifically, the tilt sensor 166 has a weight supported by the vehicle 10 to be swingable in the forward, rearward, leftward, and rightward directions, so that the tilt sensor 166 can output to the ECU 100 a detection signal indicative of the movement displacement of the weight swung in response to the inclination of the vehicle 10 in the forward, rearward, leftward, or rightward directions.

The seat position sensor 167 is under the control of the ECU 100, and adapted to detect the position of the driver's seat to be seated by the driver, and to output a detection signal indicative of the detected position of the driver's seat to the ECU 100. Here, the present embodiment will be explained with the driver's seat having a smaller value toward the forward position in the vehicle 10. Here, the forward position is intended to indicate a position closer to the accelerator pedal 212, the foot brake pedal 213, and a steering wheel.

In addition, the ECU 100 is adapted to determine whether or not the vehicle 10 is travelling on a bad road based on the position of the driver's seat detected by the seat position sensor 167. More specifically, the ECU 100 is operative to determine that the vehicle 10 is travelling on a bad road when the value of the position of the driver's seat detected by the seat position sensor 167 is equal to or less than a predetermined value of a bad road determination seat position, viz., a forwardly moved seat position, while the ECU 100 is operative to determine that the vehicle 10 is not travelling on a bad road when the value of the position of the driver's seat detected by the seat position sensor 167 is over the predetermined value of the bad road determination seat position.

Next, the construction of the automatic transmission 13 in the present embodiment will be described with reference to the schematic block diagram shown in FIG. 3.

Figure 3:
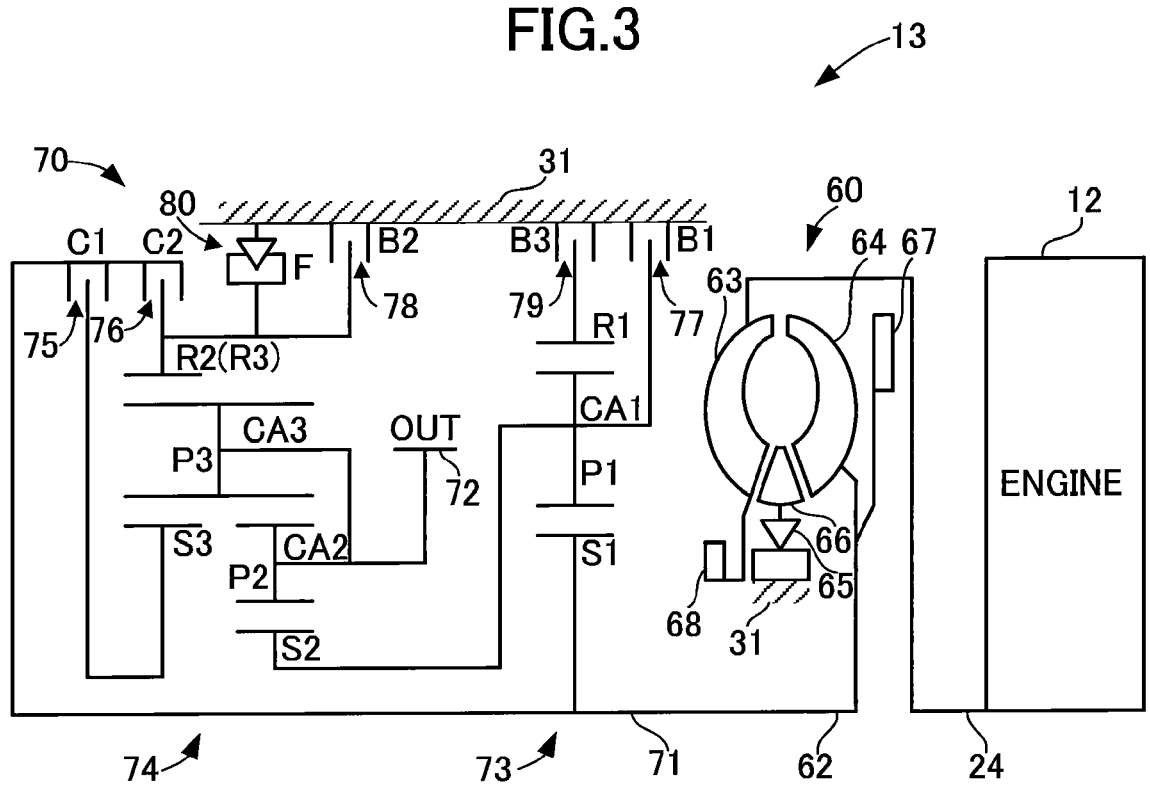
FIG. 3 is a schematic block diagram of an automatic transmission in the first embodiment of the present invention.

As shown in FIG. 3, the automatic transmission 13 comprises a torque converter 60 that transmits the torque outputted by the engine 12, and a transmission mechanism 70 that conducts the speed changes between the rotation speed of the input shaft 71 serving as an input shaft and the rotation speed of the output gear 72 serving as an output gear.

Between the transmission mechanism 70 and the front differential mechanism 14 is generally provided a reduction gear mechanism having the torque inputted by the transmission mechanism 70 to output the torque to the front differential mechanism 14 while reducing the rotation speed and increasing the driving force. For simplifying the explanation hereinafter, the vehicle 10 in the present embodiment will be described as being designed to directly transmit the torque to the front differential mechanism 14 from the transmission mechanism 70 without providing such a reduction gear mechanism.

The torque converter 60 is arranged between the engine 12 and the transmission mechanism 70, and comprises a pump impeller 63 inputted with the torque from the engine 12, a turbine runner 64 outputting the torque to the transmission mechanism 70, a stator 66 that changes the flow direction of oil, and a lock-up clutch 67 that directly connects the pump impeller 63 with the turbine runner 64, so that the torque can be transmitted through the oil.

The pump impeller 63 is connected to the crank shaft 24 of the engine 12. The pump impeller 63 is designed to be rotated integrally with the crank shaft 24 by the torque of the engine 12.

The turbine runner 64 is connected to the turbine shaft 62 which is in turn connected to the transmission mechanism 70. The turbine shaft 62 is directly connected to the input shaft 71 of the transmission mechanism 70. The turbine runner 64 is rotated by the flow of the oil pushed by the rotation of the pump impeller 63, and designed to output to the transmission mechanism 70 the rotation of the crank shaft 24 of the engine 12 through the turbine shaft 62.

The stator 66 is rotatably supported through a one-way clutch 65 by a housing 31 of the automatic transmission 13 constituting a non-rotating member. The stator 66 serves to change the directions in flow of the oil from the turbine runner 64 and into the pump impeller 63 to generate a force to turn the pump impeller 63. The stator 66 is prevented from rotating by the one-way clutch 65 to change the direction of the oil flowing in the stator 66.

The stator 66 idles away to prevent a reverse torque from being applied to the turbine runner 64 when the pump impeller 63 and the turbine runner 64 come to be rotated at almost the same rotation speed.

The lock-up clutch 67 is constructed to directly connect the pump impeller 63 and the turbine runner 64 to have the rotation of the crank shaft 24 of engine 12 mechanically transmitted directly to the turbine shaft 62.

Here, the torque converter 60 is adapted to transmit the torque through the oil between the pump impeller 63 and the turbine runner 64. Therefore, the rotation of the pump impeller 63 cannot transmit the torque by 100% to the turbine runner 64. For this reason, when the speeds of the turbine shaft 62 and the crank shaft 24 become close to each other, the lock-up clutch 67 is operated to mechanically connect the pump impeller 63 and the turbine runner 64 directly, more particularly, to mechanically directly connect the crank shaft 24 to the turbine shaft 62 for more efficient transmission to the transmission mechanism 70 from the engine 12, thereby resulting in improving the fuel efficiency.

The lock-up clutch 67 is constructed to be able to realize a flex lock-up causing a slip at a predetermined slip ratio. The state of the lock-up clutch 67 is adapted to be selected by the CPU of the ECU 100 in response to the travel state of the vehicle 10, more specifically, the vehicle speed V and the accelerator opening degree Acc based on the lock-up control map stored in the ROM of the ECU 100. In addition, the state of the lock-up clutch 67 can, as described above, assume either one of a converter state having the lock-up clutch 67 released, a lock-up state having the lock-up clutch 67 coupled, and a flex lock-up state having the lock-up clutch 67 slipped.

In addition, the pump impeller 63 is provided with a mechanical type of oil pump 68 that generates hydraulic pressure used for performing the transmission action of the transmission mechanism 70, and for supplying the oil to activate, lubricate and cool parts and elements.

The transmission mechanism 70 comprises, in addition to the input shaft 71 and the output gear 72, a first planetary gear 73, a second planetary gear 74, a C1 clutch 75, a C2 clutch 76, a B1 brake 77, a B2 brake 78, a B3 brake 79, and an F one-way clutch 80.

The input shaft 71 is directly connected to the turbine shaft 62 of the torque converter 60 so that the input shaft 71 can be directly inputted with the outputted rotation of the torque converter 60. The output gear 72 is connected with a carrier of the second planetary gear 74 and is held in engagement with a differential ring gear 42 of the front differential mechanism 14 as will be described hereinafter, so that the output gear 72 can function as a counter drive gear. This means that the output gear 72 is adapted to transmit the outputted rotation of the transmission mechanism 70 to the front differential mechanism 14.

The first planetary gear 73 is constituted by a single pinion type of planetary gear mechanism. The first planetary gear 73 comprises a sun gear S1, a ring gear R1, a pinion gear P1, and a carrier CA1.

The sun gear S1 is coupled to the input shaft 71. The sun gear S1 is connected to the turbine shaft 62 of the torque converter 60 through the input shaft 71. The ring gear R1 is selectively fixed to the housing 31 of the automatic transmission 13 through the B3 brake 79.

The pinion gear P1 is rotatably supported by the carrier CA1. The pinion gear P1 is held in mesh with the sun gear S1 and the ring gear R1. The carrier CA1 is selectively fixed to the housing 31 of the automatic transmission 13 through the B1 brake 77.

The second planetary gear 74 is constituted by a ravigneaux type of planetary gear mechanism. The second planetary gear 74 comprises a sun gear S2, ring gears R2, R3, a short pinion gear P2, a long pinion gear P3, a sun gear S3, a carrier CA2, and a carrier CA3.

The sun gear S2 is connected with the carrier CA1 of the first planetary gear 73. The ring gears R2, R3 are selectively connected to the input shaft 71 through the C2 clutch 76. The ring gears R2, R3 are selectively fixed to the housing 31 through the B2 brake 78. The ring gears R2, R3 are blocked in rotation in a rotation direction opposite to the rotation direction of the input shaft 71 (hereinafter simply referred to as "opposite direction") by the F one-way clutch 80 provided in parallel with the B2 brake 78.

The short pinion gear P2 is rotatably supported by the carrier CA2. The short pinion gear P2 is held in mesh with the sun gear S2 and the long pinion gear P3. The long pinion gear P3 is rotatably supported by the carrier CA3. The long pinion gear P3 is held in mesh with the short pinion gear P2, the sun gear S3, and the ring gears R2, R3.

The sun gear S3 is selectively connected with the input shaft 71 through the C1 clutch 75. The carrier CA2 is connected with the output gear 72. The carrier CA3 is connected to the carrier CA2 and the output gear 72.

In addition, the B1 brake 77, the B2 brake 78, and the B3 brake 79 are fixed to the housing 31 of the automatic transmission housing 13. The C1 clutch 75, the C2 clutch 76, the F one-way clutch 80, the B1 brake 77, the B2 brake 78, and the B3 brake 79 (hereinafter simply referred to as "clutch C" and "brake B", respectively, as long as the above clutches and the above brakes are particularly not needed to be distinguished) are each constituted by a hydraulic type of friction engagement device having a multi-plate type of clutch or brake hydraulically activated and controlled by a hydraulic actuator. The clutch C and the brake B are changeable to assume the engagement state from the disengagement state, and vice versa, through the hydraulic circuit to be changed by the energization or de-energization of the linear solenoid valves SL1 to SL5, SLU, SLT, and the on-off solenoid valve SL of the hydraulic control device 110 and to be changed by the operation state of the manual valve not shown.

Next, the transmission mechanism 70 of the automatic transmission 13 in the present embodiment will be explained hereinafter with reference to the operating table shown in FIG. 4 while focusing on the engagement state of the frictional engagement elements to realize each of the transmission stages.

As shown in FIG. 4, the operating table to be used for realizing each of the transmission stages shows the engagement and disengagement states to be assumed by each of the frictional engagement elements of the transmission mechanism 70, viz., the clutches C and the brakes B to realize each of the transmission stages. In FIG. 4, the mark "O" (circle) is representative of the engagement, and the mark "X" (cross) is representative of the disengagement. The mark "⊚" (double circle) is representative of the engagement only at the time of applying an engine brake, and the mark "Δ" (triangle) is representative of the engagement only at the time of driving the vehicle 10.

In accordance with the combination of the engagement and disengagement shown in the operating table, each of the frictional engagement elements are operated by the energization and de-energization or the electric current control of the linear solenoid valves SL1 to SL5 provided in the hydraulic control device 110 (see FIG. 1) and the transmission solenoids not shown to establish the first to sixth stages of the forward speed change stages and the rearward speed change stage.

In accordance with the operating table, the ECU 100 is operated to engage the F one-way clutch 80 in addition to the engagement of the C1 clutch 75 at the time of driving the vehicle 10, for example, in the case of realizing the first speed state. Further, the ECU 100 is operated to engage the B2 brake 78 in addition to the C1 clutch 75 at the time of applying the engine brake in the case of realizing the first speed state.

For realizing the rearward speed change stage, the ECU 100 is operated to engage the B2 brake 78 and the B3 brake 79. Further, for realizing the neutral range and the parking range, the ECU 100 is operated to disengage all of the C1 clutch 75, the C2 clutch 76, the B1 brake 77, the B2 brake 78, the B3 brake 79, and the F one-way clutch 80. In this way, all of the disengagements of the frictional engagement elements of the transmission mechanism 70 cause the neutral state with no torque transmission between the input side and the output side to be established.

Next, the function about each of the solenoid valves of the hydraulic control device 110 will be explained hereinafter.

The linear solenoid valve SLT is adapted to perform the hydraulic control of the line pressure PL serving as an original hydraulic pressure of the oil to be supplied to the parts and the elements. More specifically, the linear solenoid valve SLT is controlled by the ECU 100 to adjust the line pressure PL on the basis of the throttle opening degree θ th, an intake air amount Qar of the engine 12, a temperature Tw of the cooling water of the engine 12, the rotation speed Ne of the engine 12, the rotation speed Nm of the input shaft, viz., the rotation speed Nt of the turbine, a temperature Tf of the oil in the automatic transmission 13 and the hydraulic control device 110, shift positions Psh, shift ranges, and other factors.

The linear solenoid valve SLU is adapted to perform the lock-up control of the lock-up mechanism. More specifically, the linear solenoid valve SLU is controlled by the ECU 100 on the basis of the engine speed Ne indicative of the input rotation speed of the torque converter 60, the turbine rotation speed Nt indicative of the output rotation speed of the torque converter 60, the throttle opening degree θ th, the vehicle speed V, the input torque, and other factors to adjust the pressure of a lock-up relay valve and a lock-up control valve not shown in the drawings to control the lock-up clutch 67. The on-off solenoid valve SL is adapted to perform the changing operation of the hydraulic pressure of the lock-up relay valve.

The linear solenoid valves SL1 to SL5 serve to perform the speed change control. The linear solenoid valves SL1 and SL2 function to hydraulically control the C1 clutch 75 and the C2 clutch 76. The linear solenoid valves SL3, SL4 and SL5 are designed to hydraulically control the B1 brake 77, the B2 brake 78, and the B3 brake 79.

The constructions of the front differential mechanism 14 and the transfer 16 in the present embodiment will be explained hereinafter with reference to the schematic block diagram shown in FIG. 5.

Figure 5:
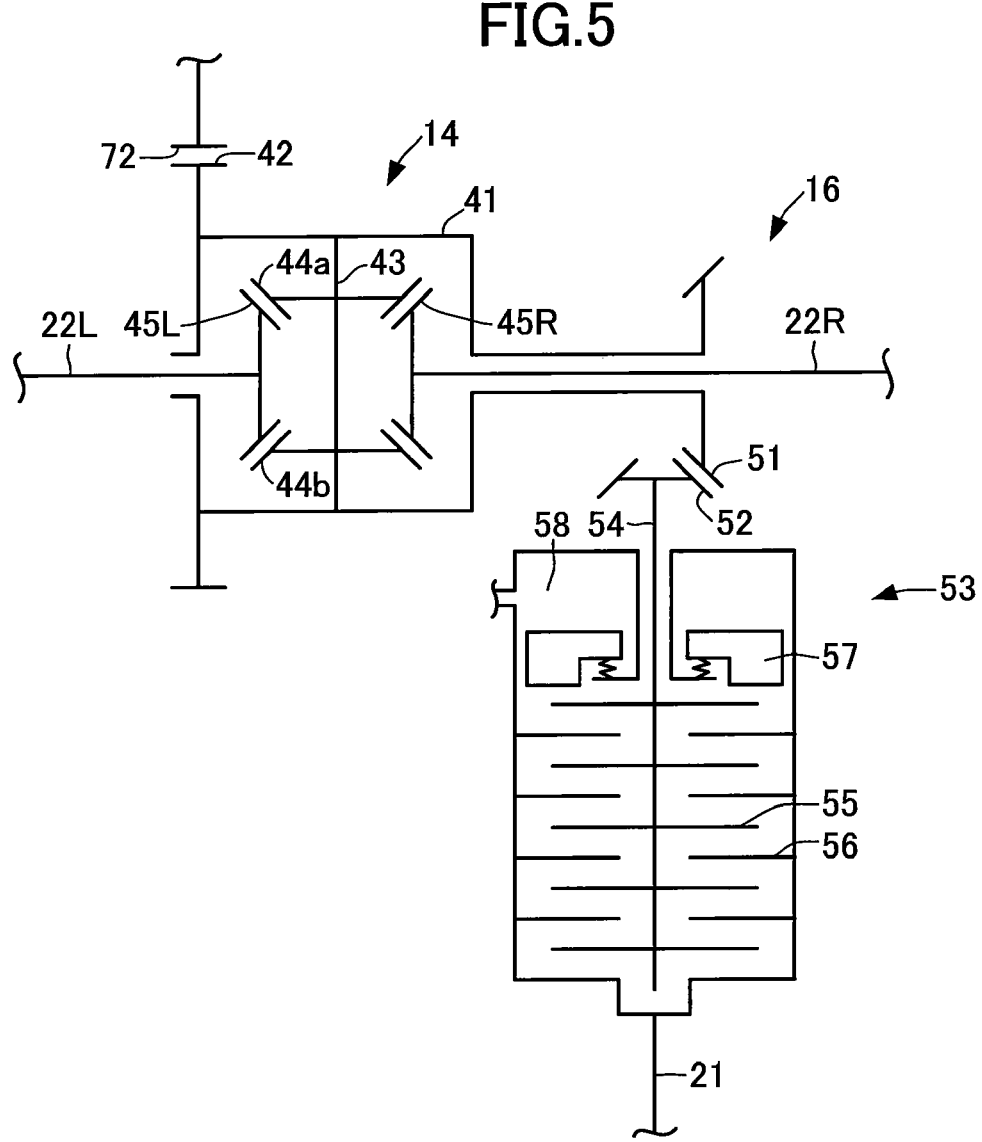
FIG. 5 is a schematic block diagram representing the constructions of a front differential mechanism and a transfer in the first embodiment of the present invention.

As shown in FIG. 5, the front differential mechanism 14 comprises a hollow differential gear case 41, a differential ring gear 42 provided on the outer peripheral portion of the differential gear case 41, a pinion shaft 43 provided in the differential gear case 41, differential pinion gears 44a, 44b, and side gears 45L, 45R. Further, the differential pinion gears 44a, 44b, and the side gears 45L, 45R are each constituted by a bevel gear.

The differential gear case 41 is rotatably supported on and around the front drive shafts 22L, 22R. The differential ring gear 42 is provided on the outer peripheral portion of the differential gear case 41, and in engagement with the output gear 72 of the automatic transmission 13. The pinion shaft 43 is in parallel with the differential ring gear 42 and secured to the differential gear case 41, so that the pinion shaft 43 is rotated integrally with the differential gear case 41.

The differential pinion gears 44a, 44b are rotatably supported on and around the pinion shaft 43. The side gear 45L is securely mounted on and rotated integrally with the front drive shaft 22L, and is held in meshing engagement with the differential pinion gear 44a and the differential pinion gear 44b. In a similar manner, the side gear 45R is securely mounted on and rotated integrally with the front drive shaft 22R, and is held in meshing engagement with the differential pinion gear 44a and the differential pinion gear 44b.

It is thus to be noted that the front differential mechanism 14 is constructed to have the side gear 45L and the side gear 44R rotated together when the differential pinion gear 44a and the differential pinion gear 44b are not rotated. On the other hand, the front differential mechanism 14 is constructed to have the side gear 45L and the side gear 44R relatively rotated in their opposite directions when the differential pinion gears 44a, 44b are rotated. It is therefore understood that the front differential mechanism 14 is constructed to allow the rotation speed difference between the side gear 45L integrally rotated with the front drive shaft 22L and the side gear 45R integrally rotated with the front drive shaft 22R, thereby making it possible to absorb the rotation speed difference between the front wheel 17L and the front wheel 17R when the vehicle is travelling on a curved road.

The rear differential mechanism 15 is the same in construction as the front differential mechanism 14, and thus will not be explained in detail hereinafter. The rear differential mechanism 15 has the differential ring gear 42 held in mesh with the pinion gear of the propeller shaft 21 in place of the output gear 72 of the automatic transmission 13. The rear differential mechanism 15 has the left and right side gears rotated integrally with the rear drive shafts 23L, 23R in lieu of the front drive shafts 22L, 22R.

The transfer 16 comprises a hypoid gear 51, a hypoid pinion 52, and a transfer clutch 53.

The hypoid gear 51 is integrally rotated with the differential gear case 41 of the front differential mechanism 14 to input the torque to the transfer 16 from the automatic transmission 13 through the front differential mechanism 14. The hypoid pinion 52 and the hypoid gear 51 are each constituted by a gear such as for example a bevel gear to change the rotation direction of the torque at an angle of 90 degrees when transmitting the torque inputted from the hypoid gear 51.

The transfer clutch 53 comprises an input shaft 54, a plurality of multi-plate clutch discs 55, a plurality of multi-plate clutch plates 56, and a piston 57, and has a hydraulic servo chamber 58 formed therein. The transfer clutch 53 is constructed to have the hypoid pinion 52 and the propeller shaft 21 connected with each other to make it possible for the torque to be transmitted. The transfer clutch 53 itself is constructed by a known wet multi-plate clutch of a hydraulic servo type.

The input shaft 54 is drivably connected with the hypoid pinion 52 to be inputted with the torque from the hypoid pinion 52 and to output the torque to the multi-plate clutch discs 55. The multi-plate clutch plates 56 are constructed to transmit the torque to the propeller shaft 21. The multi-clutch discs 55 and the multi-plate clutch plates 56 collectively constitute a multi-plate clutch as defined in the present invention.

The hydraulic pressure in the hydraulic servo chamber 58 is controlled by the hydraulic control device, so that the hydraulic pressure fed into the hydraulic servo chamber 58 causes the multi-plate clutch discs 55 and the multi-plate clutch plates 56 to be pressed by the piston 57 at a predetermined pressure, thereby securing a predetermined amount of torque transmission therebetween.

The transfer 16 is constructed to distribute the driving force of the engine 12 to the front wheels 17L, 17R and the rear wheels 18L, 18R as understood from the previous description. This means that the transfer 16 constitutes a driving force distribution device as defined in the present invention.

The following description will be directed to the determination method of a bad road travelling of the vehicle 10 by the ECU 100 according to the present embodiment. For example, the ECU 100 is adapted to determine whether or not the vehicle 10 is currently travelling on a bad road in accordance with the torque distribution of the transfer 16. More specifically, the ECU 100 is adapted to determine whether or not the vehicle 10 is currently travelling on a bad road in accordance with an input and output rotation speed ratio of the rotation speed TRin of the input shaft of the transfer 16 detected by the transfer input rotation speed sensor 163 and the rotation speed TRout of the output shaft of the transfer 16 detected by the transfer output rotation speed sensor 164 or the changed state of the power changing switch 215 of the transfer 16 detected by the distribution SW sensor 165.

In addition, the ECU 100 is adapted to determine whether or not the vehicle 10 is travelling on a bad road in accordance with the travel mode selected by the driver. Further, the ECU 100 may be adapted to determine whether or not the vehicle 10 is travelling on a bad road in accordance with the tilt angle of the vehicle 10 detected by the tilt sensor 166, the temporal variation in the tilt angle of the vehicle 10, i.e., the rocking motion detected by the tilt sensor 166, the position of the driver's seat detected by the seat position sensor 167, or a difference of the driver's seat position from the position of the driver's seat stored in advance in the EEPROM. Further, the ECU 100 can determine whether or not the vehicle 10 is travelling on a bad road in accordance with the topographical information of the current position acquired by the navigation system 170.

The ECU 100 is designed to use one of or a combination of the bad road travelling determination methods previously described for determining whether or not the vehicle 10 is travelling on a bad road.

The characteristic construction of the ECU 100 mounted on the vehicle 10 in the embodiment according to the present invention will be explained hereinafter.

The ECU 100 is adapted to shut off the torque from the engine 12 to be transmitted to the front wheels 17L, 17R and the rear wheels 18L, 18R. In addition, the ECU 100 is adapted to automatically stop the engine 12 when a predetermined stop condition is established, thereby shutting off the transmission of the torque. This means that the engine 12 is provided with an eco-run function to automatically stop the engine 12.

The ECU 100 is adapted to turn the idle SW on to carry out the automatic stopping of the engine 12, viz., an eco-run control function when the control accelerator opening degree is equal to or less than the idle determination value. This means that the ECU 100 constitutes a power shutoff unit as defined in the present invention.

The ECU 100 is adapted to determine that the control permission is established when the depression of the accelerator pedal 212 is detected by the accelerator sensor 142, and the depression of the foot brake pedal 213 is detected by the FB sensor 143.

The ECU 100 is further adapted to determine that the control permission condition is established when the depression of the foot brake pedal 213 is detected by the FB sensor 143 in the state that the depression of the accelerator pedal 212 is being detected by the accelerator sensor 142. The ECU 100 is further adapted to determine that the control permission condition is established when the deceleration of the vehicle 10 is determined. This means that the ECU 100 constitutes a permission condition determination unit as defined in the present invention.

Further, the ECU 100 is adapted to convert the actual accelerator opening degree Acc detected by the accelerator sensor 142 to a controlled accelerator opening degree to execute a reduction control to reduce the torque outputted from the engine 12 when the ECU 100 determines that the control permission condition is established. The ECU 100 is further adapted to execute the reduction control when the vehicle speed V detected by the front wheel rotation speed sensor 161 is equal to or faster than a predetermined vehicle speed. Moreover, the ECU 100 is adapted to execute the reduction control when the control permission condition is established for a predetermined period of time or longer.

The ECU 100 is further adapted to finish the reduction control when the amount of depression of the accelerator pedal 212 detected by the accelerator sensor 142 is changed by larger than a predetermined amount of depression. The ECU 100 is adapted to finish the reduction control of the driving force outputted from the engine 12 when the foot brake pedal 213 not being depressed is detected by the FB sensor 143. This means that the ECU 100 constitutes an output control unit as defined in the present invention.

Further, the ECU 100 is adapted to prohibit the shutoff of the transmission of the torque to be transmitted from the engine to the front wheels 17L, 17R and the rear wheels 18L, 18R when the ECU 100 executes the reduction control. The ECU 100 is further adapted to prohibit the automatic stopping of the engine 12 when the ECU 100 executes the reduction control.

Moreover, the ECU 100 is adapted to set the controlled accelerator opening degree to be converted equal to or larger than the accelerator lower limit value which is larger than the idle determination value. This means that the ECU 100 constitutes a power shutoff prohibition unit as defined in the present invention.

The ECU 100 is further adapted to determine the deceleration based on the state of the vehicle 10. The ECU 100 is adapted to determine the deceleration based on the amount of depression of the foot brake pedal 213 detected by the FB sensor 143. The ECU 100 is further adapted to determine the deceleration based on the rotation speed of the rear wheels 18L, 18R constituted by the rolling wheels detected by the rear wheel rotation speed sensor 162. This means that the ECU 100 constitutes a deceleration determination unit as defined in the present invention.

Next, the operation of the vehicle control process in the present embodiment will be explained with reference to the flowchart shown in FIG. 6.

Figure 6:
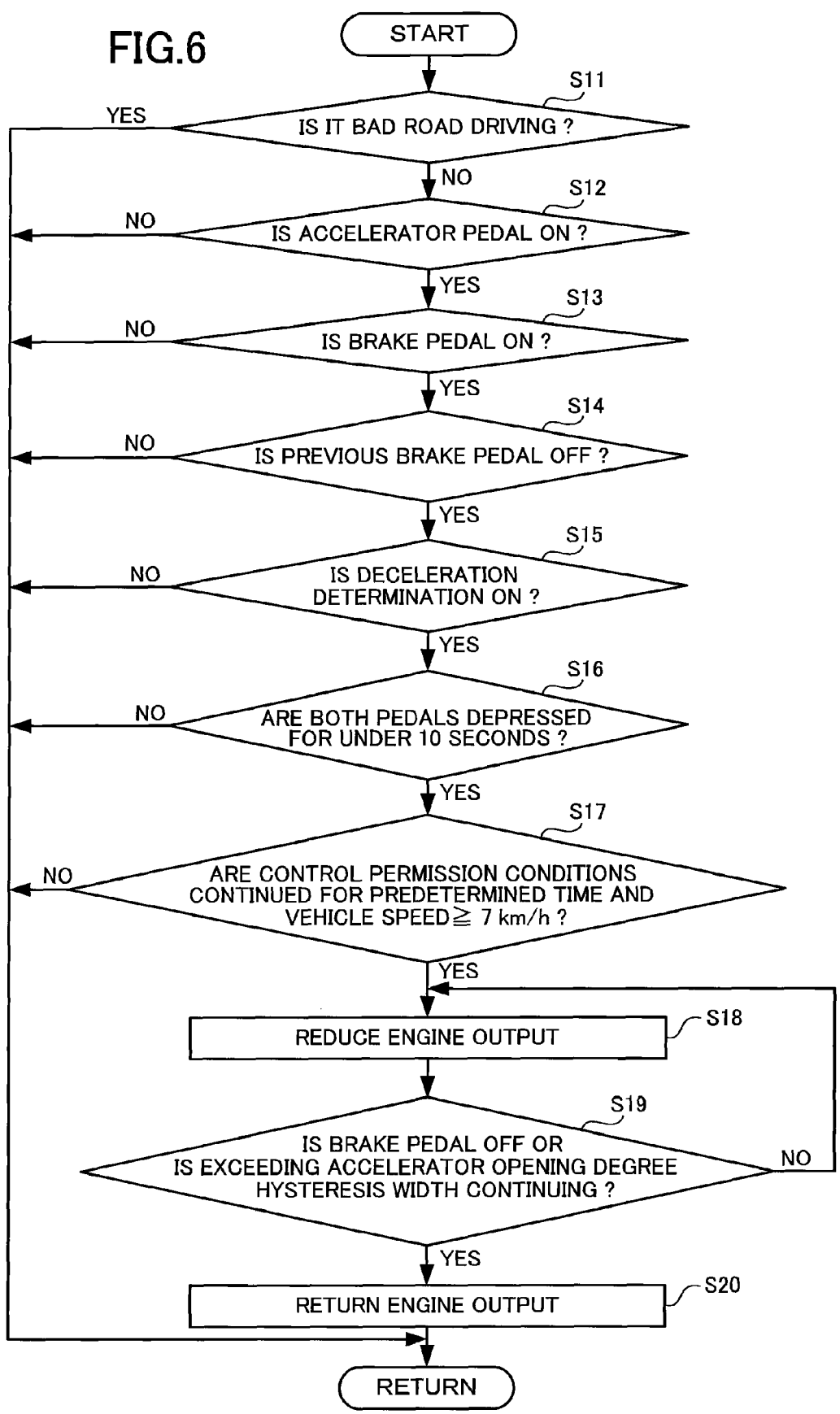
FIG. 6 is a flowchart showing a vehicle control process in the first embodiment of the present invention.

The flow chart shown in FIG. 6 shows the execution content of the program of the vehicle control process to be executed by the ECU 100 with the RAM as a work area. The program of the vehicle control process is stored in the ROM of the ECU 100. The vehicle control process is adapted to be executed by the CPU of the ECU 100 at a time interval set in advance.

As shown in FIG. 6, the ECU 100 is initially operated to determine whether or not the vehicle is travelling on a bad road (Step S11). One or more determination methods in combination on whether or not the vehicle is travelling on a bad road are carried out by the ECU 100.

The ECU 100 is adapted to finish the vehicle control process when the vehicle is determined by the ECU 100 to be travelling on a bad road ("YES" in Step S11), resulting from the fact that the reduced torque of the engine 12 tends to cause hesitation and others, thereby deteriorating the drivability.

When, on the other hand, the vehicle is determined by the ECU 100 to be not travelling on a bad road ("NO" in Step S11), the ECU 100 then determines whether or not the accelerator is "on" and finishes the vehicle control process if the accelerator is not "on" (Step S12). More specifically, the ECU 100 is adapted to determine whether or not the accelerator opening degree Acc detected by the accelerator sensor 142 is equal to or more than the accelerator pedal depression determination value Acc_tv stored in the ROM. When the ECU 100 determines that the accelerator opening degree Acc is equal to or more than the accelerator pedal depression determination value Acc_tv, the ECU 100 determines that the accelerator pedal 212 is depressed, viz., the accelerator is "on". When, on the other hand, the ECU 100 determines that the accelerator opening degree Acc is less than the accelerator pedal depression determination value Acc_tv, the ECU 100 determines that the accelerator pedal 212 is not depressed, viz., the accelerator is "off".

When the ECU 100 determines that the accelerator is "on" ("YES" in Step S12), the ECU 100 then determines whether or not the brake is "on" and finishes the vehicle control process if the brake is not "on" (Step S13). More specifically, the ECU 100 determines whether or not the brake pedal depression force Bf detected by the FB sensor 143 is equal to or more than the brake pedal depression determination value Bf_tv stored in the ROM. When the ECU 100 determines that the brake pedal depression force Bf detected by the FB sensor 143 is equal to or more than the brake pedal depression determination value Bf_tv, the ECU 100 determines that the foot brake pedal 213 is depressed, viz., the brake is "on". When, on the other hand, the ECU 100 determines that the brake pedal depression force Bf is less than the brake pedal depression determination value Bf_tv, the ECU 100 determines that the foot brake pedal 213 is not depressed, viz., the brake is "off".

The ECU 100 is adapted to transfer the current brake information stored in the RAM to the previous brake information at the time of the brake-on determination process (Step S13), and stores the determined brake information to the RAM as the current brake information. Here, the brake information is information indicative of the state of the brake, viz., brake-on or brake-off. When the accelerator is "on" ("YES" in Step S12) and the brake is "on" ("YES" in Step S13), the ECU 100 starts a timer and monitors the duration of the accelerator and the brake being depressed together.

When the ECU 100 determines that the brake is "on" ("YES" in Step S13), the ECU 100 then determines whether or not the previous brake state is "off" and finishes the vehicle control process (Step S14) if the previous brake state is not "off". More specifically, the ECU 100 reads the previous brake information stored in the RAM, and determines whether or not the brake state is "off".

By the accelerator-on determination process (Step S12), the brake-on determination process (Step S13), and the previous brake-off determination process (Step S14), it can be determined by the ECU 100 that the foot brake pedal 213 is depressed later in the state that the accelerator pedal 212 is being depressed.

When the ECU 100 determines that the previous brake state is "off" ("YES" in Step S14), the ECU 100 then performs speed reduction determination, and finishes the vehicle control process (Step S15) if the vehicle 10 is not in speed reduction. More specifically, the ECU 100 determines whether or not the vehicle speed V calculated from the rotation speed detected by the front wheel rotation speed sensor 161 is lowered by a predetermined vehicle speed or larger. If the vehicle speed V is lowered by the predetermined vehicle speed or larger, it is determined by the ECU 100 that the vehicle is decelerated, and if the vehicle speed V is lowered not by the predetermined vehicle speed or larger, it is determined by the ECU 100 that the vehicle is not decelerated. While the predetermined vehicle speed for the ECU 100 to determine the deceleration may be a fixed value, it is desirable that the value corresponds to the vehicle speed V.

Furthermore, the above deceleration determination does not result in any problem because the process is essentially performed while the vehicle is driving on a normal road, but not on a bad road. However, to cope with bad road driving, it is conceivable that the process is performed as follows.

For example, the ECU 100 determines whether or not the brake pedal force Bf detected by the FB sensor 143 is not less than the deceleration brake determination value BfDc_tv stored in the ROM. If the brake pedal force Bf is not less than the deceleration brake determination value BfDc_tv, the ECU 100 determines that the vehicle is decelerated, and if the brake pedal force Bf is below the deceleration brake determination value BfDc_tv, the ECU 100 determines that the vehicle is not decelerated.

At the time when the two-wheel drive mode is selected in the transfer 16, the ECU 100 can determine the deceleration by the amount of change in the vehicle body speed Vr. The vehicle body speed Vr can be obtained from the rotation speed detected by the rear wheel rotation speed sensor 162 which are capable of detecting the rotation speed of the rear wheels 18L, 18R, i.e., the rolling wheels. While the vehicle is a two-wheel drive vehicle type, and thus is provided with no transfer 16, the vehicle is to travel in the two-wheel driven mode at all times with either pair of the rear wheels 18L, 18R or the front wheels 17L, 17R serving as the rolling wheels. Accordingly, the above deceleration determination can be performed if the vehicle body speed Vr is always obtained by the rear wheel rotation speed sensor 162 or the front wheel rotation speed sensor 161.

Moreover, the vehicle 10 may be provided with an acceleration sensor for detecting the acceleration of the vehicle 10 to have the ECU 100 perform the deceleration determination in accordance with the acceleration detected by the acceleration sensor.

When the ECU 100 determines the speed reduction ("YES" in Step S15), the ECU 100 determines whether or not the state of the accelerator pedal and the brake pedal being depressed together continues for less than 10 seconds. When the ECU 100 determines that the state of the accelerator pedal and the brake pedal being depressed together continues for 10 or more seconds, the ECU 100 finishes the vehicle control process (Step S16). Here, the reason why the vehicle control process is finished when the state of the accelerator pedal and the brake pedal being depressed together continues for 10 or more seconds is due to the fact that the ECU 100 cannot definitely determine whether or not the torque of the engine 12 should be decreased when the accelerator pedal 212 and the foot brake pedal 213 are always depressed together.

When the ECU 100 determines that the state of the accelerator pedal and the brake pedal being depressed together continues for less than 10 seconds ("YES" in Step S16), the ECU 100 then determines whether or not the control permission condition (Step S11 to Step S16) continues for a predetermined period of time, and the vehicle speed V is equal to or more than 7 (km/h). The ECU 100 finishes the vehicle control process (Step S17) if the control permission condition established is not continuing for the predetermined period of time or if the vehicle speed is less than 7 (km/h) (Step S17). Here, the detection value to be used for the vehicle speed determination is preferably the vehicle body speed Vr as previously mentioned.

When the ECU 100 determines that the control permission condition continues for the predetermined period of time and the vehicle speed is equal to or more than 7 (km/h) ("YES" in Step S17), the ECU 100 performs the reduction control process of the torque of the engine 12 (Step S18). The more specific method of the torque reduction control will become apparent as the description proceeds hereinafter.

Then, the ECU 100 determines whether or not the brake is "off" or the state of the hysteresis width of the accelerator opening degree exceeding a predetermined hysteresis width continues for a predetermined period of time. When the ECU 100 determines that the brake is "on" and the hysteresis width of the accelerator opening degree is equal to or less than the predetermined hysteresis width, or a predetermined period of time has not elapsed even if the hysteresis width of the accelerator opening exceeds the predetermined hysteresis width, the ECU 100 returns (Step S19) to the engine torque reduction control process (Step S18). Here, the hysteresis width of the accelerator opening degree is intended to indicate the difference between the actual accelerator opening degree Acc before the engine torque reduction control process (Step S18) and the current actual accelerator opening degree Acc detected by the accelerator sensor 142.

When the ECU 100 determines that the brake is "off", or the state of the hysteresis width of the accelerator opening degree exceeding the predetermined hysteresis width continues for a predetermined period of time ("YES" in Step S19), the ECU 100 performs the torque returning process of the engine 12 and finishes the vehicle control process (Step S20). For example, when the ECU 100 rewrite the accelerator opening degree in the engine torque reduction control process (Step S18), the accelerator opening degree is returned to the actual accelerator opening degree Acc detected by the accelerator sensor 142 to return the torque of the engine 12 to the torque at the time of usual vehicle travel.

Figure 7:
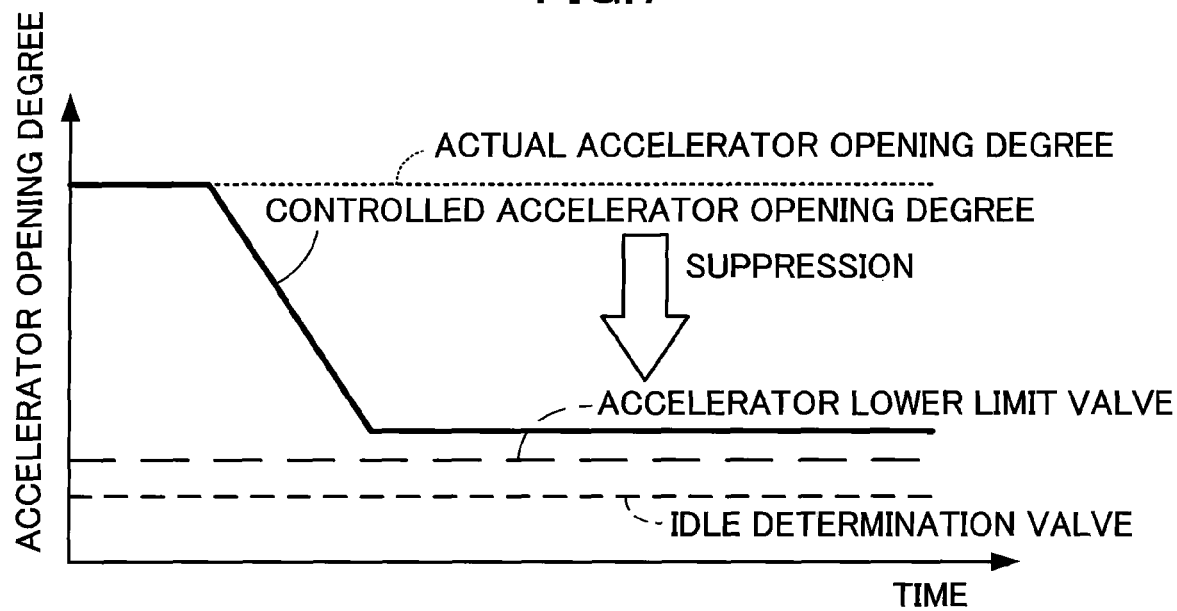
FIG. 7 is a graph showing an accelerator opening converted by the engine torque reduction control processing performed in the first embodiment of the present invention.

Next, the following explanation will be directed to the reduction control process with reference to FIG. 7 showing a graph indicating the accelerator opening degree converted by the engine torque reduction control process. The reduction control process is conducted by the ECU 100.

When the control permission conditions, more specifically, Step S11 to Step S16 in the above described flowchart, and a control starting condition, i.e., Step S17 in the flowchart, are established as shown in FIG. 7, the ECU 100 is operative to reduce an accelerator opening value from the actual accelerator opening degree Acc to the output reducing accelerator opening degree Acn that reduces the torque of the engine 12. Accordingly, the accelerator opening value thus reduced has the torque lower than that of the engine output by the actual accelerator opening degree Acc.

The ECU 100 is operative to set the accelerator lower limit value larger than the idle determination value and to control the output reducing accelerator opening degree Acn to be equal to or larger than the accelerator lower limit value. Furthermore, the reduction speed of the engine torque, more specifically, the rate of conversion from the actual accelerator opening degree Acc to the output reducing accelerator opening degree Acn, i.e., the slope, can be set corresponding to the situation of the vehicle 10. For example, the conversion is conducted slowly when the actual accelerator opening degree Acc is small, and is conducted faster as the actual accelerator opening degree becomes larger, whereby the times they takes to reach the output reducing accelerator opening degree Acn can be equal to each other. Moreover, the output reducing accelerator opening degree Acn can be set not to have a fixed value, but have a calculated value in response to the situation of the vehicle 10 such as the vehicle speed V and the slope of road.

It will be understood from the foregoing description that when the depressions of both the accelerator pedal 212 and the foot brake pedal 213 are concurrently detected in the vehicle 10 provided with the function to shut off the transmission of the torque transmitted from the engine 12 to the front wheels 17L, 17R, the vehicle control apparatus according to the present embodiment is operated to prohibit the shutoff of the torque transmission caused by the execution of the reduction control, while the reduction control to reduce the torque output from the engine 12 is being executed. As a consequence, the vehicle 10 can be prevented from being stopped unnecessarily even when the torque of the engine 12 is lowered, thereby making it possible to prevent the drivability from being deteriorated.

More specifically, in the vehicle 10 provided with an economical running control function that automatically stops the engine 12 when a predetermined stopping condition is established, the vehicle control apparatus according to the present embodiment is operated to prohibit the automatic stopping of the engine 12 caused by the execution of reduction control during executing the reduction control to reduce the torque output from the engine 12. As a consequence, the unnecessary automatic stopping of the engine 12 can be prevented, and thus the deterioration of drivability can be avoided.

More specifically, the vehicle control apparatus according to the present embodiment has a control accelerator opening degree, which is to be converted when the control permission conditions, viz., the above described Step S11 to Step S16 and the control starting condition, viz., the above described Step S17 are established, the control accelerator opening degree can be equal to or larger than the accelerator lower limit value that is larger than the idle determination value at which the automatic stopping of the engine 12 is performed. As a consequence, the automatic stopping of the engine 12 is by no means performed even when the accelerator opening degree is to be converted by the establishment of the control permission conditions, thereby making it possible to prevent the drivability from being deteriorated.

Second Embodiment

Next, the following explanation will be directed hereinafter to a vehicle control apparatus according to a second embodiment of the invention. The construction of the vehicle in the present embodiment is the same as that of the vehicle 10 in the first embodiment, and thus the constituent elements of the present embodiment the same as those of the first embodiment bear the reference numerals of the present embodiment the same as those of the first embodiment in the drawings. Accordingly, the detailed explanations about the constituent elements of the present embodiment the same as those of the first embodiment will be omitted hereinafter.

The characteristic construction of the ECU 100 mounted on the vehicle 10 in the present embodiment of the invention will be described hereinafter.

The ECU 100 is operative to prohibit the automatic stopping of the engine 12 when the ECU 100 determines that the control permission conditions are established. It is therefore to be noted that the ECU 100 constitutes a power shutoff prohibition unit. The ECU 100 is further constructed, as being different from the first embodiment, to set a control accelerator opening degree to be converted regardless of an accelerator lower limit value.

Next, the operation of the vehicle control process in the present embodiment will be described with reference to a flowchart shown in FIG. 8.

The flowchart shown in FIG. 8 represents an executing content of a program for vehicle control process to be executed by the CPU of the ECU 100 with the RAM as a work area. The program for the vehicle control process is stored in the ROM of the ECU 100. The vehicle control process is designed to be executed by the CPU of the ECU 100 at a predetermined interval.

The processes at Step S31 to Step S37 and Step S40 to Step S41 are the same as those at Step S11 to Step S17 and Step S19 to Step S20 in the first embodiment, respectively, and thus their detailed explanations are to be omitted hereinafter.

As shown in FIG. 8, when the ECU 100 determines that the control permission conditions are continued for a certain period of time and the vehicle speed V is equal to or faster than 7 km/h (determined Yes at Step S37), the ECU 100 is operated to prohibit system control performed to refer to the idle SW (Step S38). More specifically, the ECU 100 is operated to prohibit the automatic stopping of the engine 12, i.e., the execution of an economical running control function, even when the idle SW is turned on.

Next, the ECU 100 is operative to carry out the reduction control process for the torque of the engine 12 (Step S39). More specifically, the ECU 100 is operated to reduce an accelerator opening degree value from the actual accelerator opening degree Acc to the output reducing accelerator opening degree Acn that reduces the torque of the engine 12. Here, the ECU 100 is operative to set, as being different from the first embodiment, the output reducing accelerator opening degree Acn regardless of the accelerator lower limit value.

At this time, even when the idle SW is turned on as the output reducing accelerator opening degree Acn comes to or below the idle determination value, the automatic stopping process for the engine 12 caused by the economical running control function can be prevented from being occurred because the system to refer to the idle SW is prohibited as described above.

When the ECU 100 determines that, after the engine torque reduction control process (Step S39), the brake pedal is off or the situation of accelerator opening degree hysteresis width exceeding a predetermined hysteresis width continues for a predetermined period of time (determined Yes at Step S40), the ECU 100 is operative to carry out a return process for the torque of the engine 12 (Step S41), releases the prohibition of the system control performed to refer to the idle SW, and then ends the present vehicle control process (Step S42).

It is therefore understood from foregoing description that when the control permission conditions, more specifically, the above described Step S31 to Step S36 and the control starting condition, i.e., the above described Step S37 are established, the vehicle control apparatus according to the present embodiment is operated to prohibit the system control performed to refer to the idle SW, more specifically, is operated to prohibit the economical running control that performs the automatic stopping of the engine 12. As a consequence, when the depressions of both the accelerator pedal 212 and the foot brake pedal 213 are concurrently detected, the automatic stopping of the engine 12 is by no means performed while the reduction control to reduce the torque output from the engine 12 is executed, thereby making it possible to prevent the drivability from being deteriorated.

Third Embodiment

Next, the following explanation will be directed hereinafter to a vehicle control apparatus according to a third embodiment of the invention. The construction of the vehicle in the present embodiment is the same as that of the vehicle 10 in the first embodiment, and thus the constituent elements of the present embodiment the same as those of the first embodiment bear the reference numerals of the present embodiment the same as those of the first embodiment in the drawings. Accordingly, the detailed explanations about the constituent elements of the present embodiment the same as those of the first embodiment will be omitted hereinafter.

The characteristic construction of the ECU 100 mounted on the vehicle 10 in the present embodiment of the invention will be described hereinafter. The ECU 100 is operative to determine as an idle state the state in which the control accelerator opening degree is equal to or smaller than the idle determination value. It is therefore to be noted that the ECU 100 constitutes an idle determination unit. The ECU 100 is further constructed, similarly to the second embodiment, to set a control accelerator opening degree to be converted regardless of an accelerator lower limit value.

Furthermore, the ECU 100 is operative to perform the automatic stopping of the engine 12 when the ECU 100 determines the idle state. It is therefore to be noted that the ECU 100 constitutes a power shutoff unit. Moreover, the ECU 100 is operative not to turn the idle SW on while the reduction control is being executed, and thus not to determine the idle state even if the control accelerator opening degree is equal to or smaller than the idle determination value. It is therefore to be noted that the ECU 100 constitutes a power shutoff prohibition unit.

Next, the operation of the vehicle control process in the present embodiment will be described with reference to a flowchart shown in FIG. 9.

The flowchart shown in FIG. 9 shows an executing content of a program for vehicle control process to be executed by the CPU of the ECU 100 with the RAM as a work area. The program for vehicle control process is stored in the ROM of the ECU 100. The vehicle control process is designed to be executed by the CPU of the ECU 100 at a predetermined interval.

The processes at Step S51 to Step S57 and Step S61 to Step S62 are the same as those at Step S11 to Step S17 and Step S19 to Step S20 in the first embodiment, respectively, and thus their detailed explanations are to be omitted hereinafter.

As shown in FIG. 9, when the ECU 100 determines that the control permission conditions continue for a certain period of time and the vehicle speed V is at 7 km/h or faster (determined Yes at S57), the ECU 100 is operative to carry out the reduction control process for the torque of the engine 12 (Step S58). More specifically, the ECU 100 is operative to reduce the accelerator opening degree value from the actual accelerator opening degree Acc to the output reducing accelerator opening degree Acn for reducing the torque of the engine 12. The ECU 100 is operative to set, similarly to the second embodiment, the output reducing accelerator opening degree Acn regardless of the accelerator lower limit value.

Next, the ECU 100 determines whether or not the accelerator opening degree converted, i.e., the output reducing accelerator opening degree Acn, is equal to or smaller than the idle determination value, in other words, whether or not the output reducing accelerator opening degree Acn is equal to or smaller than the opening degree having the idle SW turned on (Step S59).

If the accelerator opening degree converted is equal to or smaller than the idle determination value (determined Yes at Step S59), the ECU 100 is operative to carry out the process of not turning on the idle SW, viz., turning the idle SW off (Step S60). In contrast, if the accelerator opening degree converted is larger than the idle determination value (determined No at Step S59), the ECU 100 is operative to move on to the subsequent process with no actions.

Similarly to those in the first embodiment, the ECU 100 then determines whether or not the brake pedal is off, or whether or not the situation of the accelerator opening degree hysteresis width exceeding a predetermined hysteresis width continues for a predetermined period of time. If the brake pedal is on and if the accelerator opening degree hysteresis width is equal to or smaller than the predetermined hysteresis width or the accelerator opening degree hysteresis width over the predetermined hysteresis width does not continue for the predetermined period of time, the ECU 100 is operative to return (Step S61) to the engine torque reduction control process (Step S58).

When, on the other hand, the ECU 100 determines that the brake pedal is off, or the situation of the accelerator opening degree hysteresis width exceeding the predetermined hysteresis width continues for the predetermined period of time (determined Yes at Step S61), the ECU 100 is operative to carry out the return process for the torque of the engine 12 and then ends the present vehicle control process (Step S62).

It will therefore be understood from the foregoing description that when the control permission conditions, more specifically, the above described Step S51 to Step S56 are not established, the vehicle control apparatus according to the present embodiment is operative to turn the idle SW on when the control accelerator opening degree is equal to or smaller than the idle determination value, and to determine the idle state, and then to perform the automatic stopping of the engine 12 by the economical running control function. However, the vehicle control apparatus is operative not to turn the idle SW on and not to determine the idle state (the above described Step S60) while the reduction control is being executed. As a consequence, the automatic stopping of the engine 12 caused by the execution of the reduction control is by no means performed, thereby making it possible to prevent the drivability from being deteriorated.

Fourth Embodiment

Next, the following explanation will be directed hereinafter to a vehicle control apparatus according to a fourth embodiment of the invention. The construction of the vehicle in the present embodiment is the same as that of the vehicle 10 in the first embodiment, and thus the constituent elements of the present embodiment the same as those of the first embodiment bear the reference numerals of the present embodiment the same as those of the first embodiment in the drawings. Accordingly, the detailed explanations about the constituent elements of the present embodiment the same as those of the first embodiment will be omitted hereinafter.

The characteristic construction of the ECU 100 mounted on the vehicle 10 in the present embodiment of the invention will be described hereinafter. The brake devices 24L, 24R, 25L, 25R are constructed to apply brakes to the front wheels 17L, 17R and the rear wheels 18L, 18R, respectively. It is therefore to be noted that the brake devices 24L, 24R, 25L, 25R constitute a braking unit.

The ECU 100 is operative, when a predetermined brake holding condition is established, to execute a holding control having the brake devices 24L, 24R, 25L, 25R hold the braking of the front wheels 17L, 17R and the rear wheels 18L, 18R so as to shut off the transmission of torque from the engine 12 to the front wheels 17L, 17R and the rear wheels 18L, 18R. More specifically, when the control accelerator opening degree is equal to or smaller than the idle determination value, the ECU 100 is operative to execute the above described holding control. It is therefore to be noted that the ECU 100 constitutes a power shutoff unit.

The ECU 100 is further operative not to execute the holding control having the brake devices 24L, 24R, 25L, 25R hold the braking of the front wheels 17L, 17R and the rear wheels 18L, 18R, while it executes reduction control to reduce the torque of the engine. More specifically, the ECU 100 is operative to set the control accelerator opening degree to be converted to be equal to or larger than the accelerator lower limit value that is larger than the idle determination value. It is therefore to be noted that the ECU 100 constitutes a power shutoff prohibition unit.

The execution of the holding control having the brake devices 24L, 24R, 25L, 25R hold the braking of the front wheels 17L, 17R and the rear wheels 18L, 18R is simply referred to as a brake hold hereinafter.

The vehicle control apparatus according to the present embodiment thus constructed may carry out the brake hold when the predetermined brake holding condition is established in place of the automatic stopping of the engine 12 conducted by the economical running function in the first embodiment.

The operation of the vehicle control process in the present embodiment is the same as the operation of the vehicle control process in the first embodiment, more specifically, the same as the operation explained with reference to the flowchart shown in FIG. 6.

Accordingly, similarly to the first embodiment, when the engine torque reduction control process is carried out with the control permission conditions being established and with the control starting condition being established, the ECU 100 is operative to reduce the value of accelerator opening degree from the actual accelerator opening degree Acc to the output reducing accelerator opening degree Acn that is equal to or larger than the accelerator lower limit value which is larger than the idle determination value.

As will be understood from the foregoing description, when the predetermined brake holding condition is established, the vehicle control apparatus according to the present embodiment is operative to execute the brake hold that holds the braking of the front wheels 17L, 17R and the rear wheels 18L, 18R. However, the control accelerator opening degree converted when the control permission conditions are established is equal to or larger than the accelerator lower limit value that is larger than the idle determination value at which the brake hold is executed. As a consequence, even when the accelerator opening degree is converted with the control permission conditions being established, the brake hold is by no means performed, thereby making it possible to prevent the drivability from being deteriorated.

Fifth Embodiment

Next, the following explanation will be directed hereinafter to a vehicle control apparatus according to a fifth embodiment of the invention. The construction of the vehicle in the present embodiment is the same as that of the vehicle 10 in the first embodiment, and thus the constituent elements of the present embodiment the same as those of the first embodiment bear the reference numerals of the present embodiment the same as those of the first embodiment in the drawings. Accordingly, the detailed explanations about the constituent elements of the present embodiment the same as those of the first embodiment will be omitted hereinafter.

The characteristic construction of the ECU 100 mounted on the vehicle 10 in the present embodiment of the invention will be described hereinafter.

The ECU 100 is operative not to execute the holding control having the brake devices 24L, 24R, 25L, 25R hold braking of the front wheels 17L, 17R and the rear wheels 18L, 18R, respectively, when the ECU 100 determines that the control permission conditions are established. It is therefore to be noted that the ECU 100 constitutes a power shutoff prohibition unit. Furthermore, as being different from the first embodiment, the ECU 100 is operative to set the control accelerator opening degree to be converted regardless of the accelerator lower limit value.

The vehicle control apparatus according to the present embodiment thus constructed may carry out the brake hold when the predetermined brake holding condition is established in place of the automatic stopping of the engine 12 conducted by the economical running function in the first embodiment.

Furthermore, the operation of the vehicle control process in the present embodiment is the same as the operation of the vehicle control process in the second embodiment, more specifically, the same as the operation explained with reference to the flowchart shown in FIG. 8.

Accordingly, similarly to the second embodiment, when the control permission conditions are established and the control starting condition is established, the ECU 100 is operative to prohibit system control performed to refer to the idle SW. In the present embodiment, the system control performed to refer to the idle SW is here intended to indicate the brake hold function. Therefore, the ECU 100 is operative to prohibit the execution of the brake hold even when the idle SW is turned on.

As will be understood from the foregoing description, when the predetermined brake holding condition is established, the vehicle control apparatus according to the present embodiment is operative to execute the brake hold that holds the braking of the front wheels 17L, 17R and the rear wheels 18L, 18R. However, the vehicle control apparatus is operative to prohibit the execution of the brake hold when the control permission conditions are established. As a consequence, when the depressions of both the accelerator pedal 212 and the foot brake pedal 213 are detected at the same time, the brake hold is by no means performed even if the reduction control to reduce the torque output from the engine 12 is executed, thereby making it possible to prevent the drivability from being deteriorated.

Sixth Embodiment

Next, the following explanation will be directed hereinafter to a vehicle control apparatus according to a sixth embodiment of the invention. The construction of the vehicle in the present embodiment is the same as that of the vehicle 10 in the first embodiment, and thus the constituent elements of the present embodiment the same as those of the first embodiment bear the reference numerals of the present embodiment the same as those of the first embodiment in the drawings. Accordingly, the detailed explanations about the constituent elements of the present embodiment the same as those of the first embodiment will be omitted hereinafter.

The characteristic construction of the ECU 100 mounted on the vehicle 10 in the present embodiment of the invention will be described hereinafter.

The ECU 100 is operative to determine the idle state the state in which the control accelerator opening degree is equal to or smaller than the idle determination value. It is therefore to be noted that the ECU 100 constitutes an idle determination unit. The ECU 100 is further constructed, similarly to the second embodiment, to set the control accelerator opening degree to be converted regardless of the accelerator lower limit value.

Furthermore, the ECU 100 is operative to execute the brake hold when the ECU 100 determines the idle state. It is therefore to be noted that the ECU 100 constitutes a power shutoff unit.

Moreover, the ECU 100 is operative not to turn on the idle SW, and therefore not to determine the idle state while the reduction control is executed even when the control accelerator opening degree is equal to or smaller than the idle determination value. It is therefore to be noted that the ECU 100 constitutes a power shutoff prohibition unit.

The vehicle control apparatus according to the present embodiment thus constructed may be operative to carry out the brake hold when the idle SW is turned on in place of the automatic stopping of the engine 12 conducted by the economical running function in the first embodiment.

The operation of the vehicle control process in the present embodiment is the same as the operation of the vehicle control process in the third embodiment, more specifically, the same as the operation explained with reference to the flowchart shown in FIG. 9.

Accordingly, similarly to the third embodiment, when the control permission conditions are established and the control starting condition is established, the ECU 100 is operative to convert the accelerator opening degree value from the actual accelerator opening degree Acc to the output reducing accelerator opening degree Acn. At this time, even if the output reducing accelerator opening degree Acn is equal to or smaller than the idle determination value at which the idle SW is turned on, the ECU 100 is operative not to turn the idle SW on. Therefore, the ECU 100 is operative to by no means determine the idle state caused by the engine torque reduction control process, and thus not to execute the brake hold.

As will be understood from the foregoing description, the vehicle control apparatus according to the present embodiment is constructed to execute the brake hold holding the braking of the front wheels 17L, 17R and the rear wheels 18L, 18R when the predetermined brake holding condition is established. However, the vehicle control apparatus is not operative to determine the idle state while the engine torque reduction control process is being executed. As a consequence, the brake hold caused by the execution of the reduction control is by no means executed, thereby making it possible to prevent the drivability from being deteriorated.

While the previously mentioned embodiments have been explained about the vehicle 10 with an engine 12 functioning as a power source using gasoline as a fuel, the present invention is not limited to these embodiments, but the present invention can be applied to an electric vehicle having one or more electrical motors as power sources, a hydrogen automobile having a power source of an engine using hydrogen as a fuel, and a hybrid vehicle using both an engine and an electric motor as power sources. In these cases, the power source to lower the torque is not limited to the engine 12, but the driving force of the electric motor may be lowered according to the present invention.

While the previously mentioned embodiments each including only one ECU have been explained, the invention is not limited to these embodiments, but the vehicle control apparatus may be constructed with a plurality of ECUs according to the present invention. For example, the ECU 100 forming part of each of the above described embodiments may be constructed by a plurality of ECUs such as an E-ECU that executes the combustion control of the engine 12, and a T-ECU that executes the transmission control of the automatic transmission 13 according to the present invention. In this case, each of the above ECUs may be operative to be held in communication with other ECUs for mutual input and output of necessary information.

As will be understood from the foregoing description, the vehicle control apparatus according to the present invention has such an advantageous effect that the vehicle control apparatus is operative to prohibit the shutoff of the power transmission caused by the execution of reduction control performed to lower the driving force output from the power source, thereby preventing the vehicle from being stopped unnecessarily even when the driving force is lowered, thereby making it possible to prevent the drivability from being deteriorated. The vehicle control apparatus according to the present invention is therefore useful as a vehicle control apparatus that performs the suppression control of the output of a power source.

REFERENCE SIGNS LIST

10 Vehicle
12 Engine (Power source)
13 Automatic transmission
14 Front differential mechanism
15 Rear differential mechanism
16 Transfer
17L, 17R Front wheel
18L, 18R Rear wheel
21 Propeller shaft
22L, 22R Front drive shaft
23L, 23R Rear drive shaft
24L, 24R, 25L, 25R Brake device (Brake units)
51 Hypoid gear
52 Hypoid pinion
53 Transfer clutch
54 Input shaft
100 ECU (Power shutoff unit, Permission condition determination unit, Output control unit, Power shutoff prohibition unit, Idle determination unit, Deceleration determination unit)
110 Hydraulic control device
120 Operation panel 131 Crank sensor
142 Accelerator sensor (Accelerator opening degree detection unit)
143 FB sensor (Brake detection unit, Brake pedal force detection unit)
145 Throttle sensor
161 Front wheel rotation speed sensor (Vehicle speed detection unit)
162 Rear wheel rotation speed sensor (Vehicle body speed detection unit)
163 Transfer input rotation speed sensor
164 Transfer output rotation speed sensor
165 Distribution SW sensor
166 Tilt sensor
167 Seat position sensor
170 Navigation system
212 Accelerator pedal
213 Foot brake pedal
215 Power changing switch

The invention claimed is:

1. A vehicle control apparatus for a vehicle provided with a power source, an accelerator pedal, and a brake pedal, the vehicle control apparatus comprising:
an accelerator opening degree detection unit that detects a depression amount of the accelerator pedal as an actual accelerator opening degree;
a brake detection unit that detects a depression of the brake pedal;
a power transmission interruption unit that interrupts a power transmission to be transmitted from the power source to driving wheels;
a permission condition determination unit that determines a control permission condition being established when the depression of the accelerator pedal is detected by the accelerator opening degree detection unit, and the depression of the brake pedal is detected by the brake detection unit;
an output control unit that executes a reduction control to reduce a driving force to be outputted by the power source by converting the actual accelerator opening degree detected by the accelerator opening degree detection unit to a control accelerator opening degree at a rate of conversion corresponding to the actual accelerator opening degree while the control permission condition established is determined by the permission condition determination unit; and
a power transmission interruption prohibition unit that prohibits interrupting the power transmission to be transmitted from the power source to the driving wheels by the power transmission interruption unit while the control permission condition is established, in which
the power source has an engine,
the power transmission interruption unit is operative to interrupt the power transmission by having the engine automatically stopped when the control accelerator opening degree is not more than an idle determination value preliminary set, and
the power transmission interruption prohibition unit is operative to allow the control accelerator opening degree to be converted by the output control unit to have a value equal to or larger than accelerator lower limit value that is larger than the idle determination value, so as to prohibit the power transmission interruption unit from having the engine automatically stopped when the reduction control is executed by the output control unit.

2. The vehicle control apparatus as set forth in claim 1, in which
the power transmission interruption unit is operative to have the engine automatically stopped when the control accelerator opening degree is not more than an idle determination value preliminarily set, and
the power transmission interruption prohibition unit is operative to prohibit the power transmission interruption unit from having the engine automatically stopped when the control permission established is determined by the permission condition determination unit.

3. The vehicle control apparatus as set forth in claim 1, which further comprises
an idle determination unit that determines an idle state when the actual accelerator opening degree or the control accelerator opening degree is not more than an idle determination value preliminarily set, and in which
the power transmission interruption unit is operative to have the engine automatically stopped when the idle state is determined by the idle determination unit, and
the power transmission interruption prohibition unit is operative not to allow the idle determination unit to determine the idle state even if the control accelerator opening degree is not more than the idle determination value during the execution of the reduction control by the output control unit.

4. The vehicle control apparatus as set forth in claim 1, in which
the permission condition determination unit is operative to determine that the control permission condition is established when the depression of the brake pedal is detected by the brake detection unit in the state that the depression of the accelerator pedal is detected by the accelerator detection unit.

5. The vehicle control apparatus as set forth in claim 1, which further comprises
a vehicle speed detection unit that detects a vehicle speed, and in which
the output control unit is operative to execute the reduction control when the vehicle speed detected by the vehicle speed detection unit is not less than a predetermined vehicle speed.

6. The vehicle control apparatus as set forth in claim 1, in which
the output control unit is operative to execute the reduction control when the control permission condition established for no less than a predetermined time is determined by the permission condition determination unit.

7. The vehicle control apparatus as set forth in claim 1, in which
the output control unit is operative to finish the reduction control when the amount of depression of the accelerator pedal detected by the accelerator opening degree detection unit is varied larger than a predetermined depression amount.

8. The vehicle control apparatus as set forth in claim 1, in which
the output control unit is operative to finish the reduction control of the driving force outputted from the power source when the brake pedal not depressed is detected by the brake detection unit.

9. The vehicle control apparatus as set forth in claim 1, which further comprises
a speed reduction determination unit that detects the state of the vehicle to determine a speed reduction of the vehicle, and in which
the permission condition determination unit is operative to determine that the control permission condition is established when the speed reduction of the vehicle is determined by the speed reduction determination unit.

10. The vehicle control apparatus as set forth in claim 9, which further comprises
a brake depression force detection unit that detects a depression amount of the brake pedal, and in which
the speed reduction determination unit is operative to determine the speed reduction in accordance with the depression amount of the brake pedal detected by the brake depression force detection unit.

11. The vehicle control apparatus as set forth in claim 9, which further comprises
a vehicle body speed detection unit that detects a travel speed of the vehicle from the rotation number of driven wheels, and in which
the speed reduction determination unit is operative to determine the speed reduction in accordance with the varied rotation number of the driven wheels detected by the vehicle body speed detection unit.

12. A vehicle control apparatus for a vehicle provided with a power source, an accelerator pedal, and a brake pedal, the vehicle control apparatus comprising:
an accelerator opening degree detection unit that detects a depression amount of the accelerator pedal as an actual accelerator opening degree;
a brake detection unit that detects a depression of the brake pedal;
a driving force generation interruption unit that interrupts a power transmission to be generated from the driving force to driving wheels;
a permission condition determination unit that determines a control permission condition being established when the depression of the accelerator pedal is detected by the accelerator opening degree detection unit, and the depression of the brake pedal is detected by the brake detection unit;
an output control unit that executes a reduction control to reduce a driving force to be outputted by the power source by converting the actual accelerator opening degree detected by the accelerator opening degree detection unit to a control accelerator opening degree at a rate of conversion corresponding to the actual accelerator opening degree while the control permission condition established is determined by the permission condition determination unit;
a driving force generation interruption prohibition unit that prohibits interrupting the driving force to be generated to the driving wheels by the driving force generation interruption unit while the control permission condition is established; and
a braking unit that brakes the driving wheels, and in which
the driving force generation interruption unit is operative to interrupt the driving force generation to the driving wheels by executing a retaining control that retains the braking of the driving wheels by the braking unit while a predetermined braking retaining condition is established,
the driving force generation interruption unit is operative to execute the retaining control when the control accelerator opening degree is not more than an idle determination value preliminarily set,
the driving force generation interruption prohibition unit is operative to allow the control accelerator opening degree to be converted by the output control unit to have a value no less than accelerator lower limit that is larger than the idle determination value, so as not to allow the driving force generation interruption unit to execute the retaining control when the reduction control is executed by the output control unit.

13. The vehicle control apparatus as set forth in claim 12, in which
the driving force generation interruption unit is operative to execute the retaining control when the control accelerator opening degree is not more than an idle determination value preliminarily set, and
the driving force generation interruption prohibition unit is operative not to allow the driving force generation interruption unit to execute the retaining control when the control permission established is determined by the permission condition determination unit.

14. The vehicle control apparatus as set forth in claim 12, which further comprises
an idle determination unit that determines an idle state when the actual accelerator opening degree or the control accelerator opening degree is not more than an idle determination value preliminarily set, and in which
the driving force generation interruption unit is operative to execute the retaining control when the idle state is determined by the idle determination unit, and
the driving force generation interruption prohibition unit is operative not to allow the idle determination unit to determine the idle state even if the control accelerator opening degree is not more than the idle determination value during the execution of the reduction control by the output control unit.

\* \* \* \* \*

UNITED STATES PATENT AND TRADEMARK OFFICE
CERTIFICATE OF CORRECTION

PATENT NO. : 9,145,115 B2
APPLICATION NO. : 13/515091
DATED : September 29, 2015
INVENTOR(S) : Oishi et al.

It is certified that error appears in the above-identified patent and that said Letters Patent is hereby corrected as shown below:

In the specification

Column 1, Line 3, insert:

-- This is a 371 national phase application of PCT/JP2009/006957 filed 17 December 2009, the contents of which are incorporated herein by reference. --

Signed and Sealed this
Twenty-sixth Day of July, 2016

Michelle K. Lee
*Director of the United States Patent and Trademark Office*